United States Patent [19]

Redford et al.

[11] Patent Number: 5,711,672
[45] Date of Patent: Jan. 27, 1998

[54] METHOD FOR AUTOMATICALLY STARTING EXECUTION AND ENDING EXECUTION OF A PROCESS IN A HOST DEVICE BASED ON INSERTION AND REMOVAL OF A STORAGE MEDIA INTO THE HOST DEVICE

[75] Inventors: Peter M. Redford, Los Gatos; Donald S. Stern, San Jose, both of Calif.

[73] Assignee: TV Interactive Data Corporation, San Jose, Calif.

[21] Appl. No.: 497,177

[22] Filed: Jun. 30, 1995

Related U.S. Application Data

[63] Continuation-in-part of Ser. No. 269,492, Jul. 1, 1994.
[51] Int. Cl.⁶ ................................................ G09B 5/00
[52] U.S. Cl. .................. 434/307 R; 434/118; 434/365; 340/825.34; 364/150; 395/326; 395/927
[58] Field of Search .......................... 434/118, 307 R, 434/308, 323, 362, 365; 364/130, 138, DIG. 2, DIG. 1; 395/275, 375, 600, 625, 500, 650, 700, 800, 927, 712, 601, 761, 326, 427, 821, 851, 852, 376; 380/4, 23, 25; 340/825.36; 235/380

[56] References Cited

U.S. PATENT DOCUMENTS

| | | |
|---|---|---|
| 2,900,446 | 8/1959 | McLaughlin et al. . |
| 2,907,824 | 10/1959 | Peek, Jr. . |
| 3,005,050 | 10/1961 | Koenig, Jr. . |
| 3,304,612 | 2/1967 | Proctor et al. . |
| 3,308,253 | 3/1967 | Krakinowski . |
| 3,470,538 | 9/1969 | Harbaugh . |
| 3,522,664 | 8/1970 | Lambright et al. . |
| 3,541,541 | 11/1970 | Englebart . |
| 3,591,718 | 7/1971 | Asamo . |
| 3,593,115 | 7/1971 | Dym et al. . |
| 3,662,105 | 5/1972 | Hurst et al. . |
| 3,699,439 | 10/1972 | Turner . |
| 3,705,956 | 12/1972 | Dertourzos . |
| 3,798,370 | 3/1974 | Hurst . |
| 3,806,912 | 4/1974 | Eckert . |
| 3,885,097 | 5/1975 | Pobgee . |

(List continued on next page.)

FOREIGN PATENT DOCUMENTS

| | | |
|---|---|---|
| 61-137797 | 6/1986 | Japan . |
| 63-213016 | 9/1988 | Japan . |
| 4-104699 | 4/1992 | Japan . |
| 1120526 | 7/1968 | United Kingdom . |

OTHER PUBLICATIONS

"Developer Network", Microsoft Development Library, Oct. 94.

"LaserMouse Receiver Chip", TVI701, TV Interactive Corporation, one page, believed to be prior to Jul. 1, 1994.

(List continued on next page.)

*Primary Examiner*—Joe Cheng
*Attorney, Agent, or Firm*—Skjerven, Morrill, MacPherson, Franklin & Friel; Alan H. MacPherson; Omkar K. Suryadevara

[57] ABSTRACT

One embodiment of an autostart driver in the host device detects insertion of a storage media into a peripheral, searches for a file of a predetermined name in the storage media and automatically starts an application listed in instructions in the file. Another embodiment of the autostart driver looks for a file of the predetermined name in the host devices' permanently installed storage media prior to searching in the inserted storage media. When a previously inserted removable storage media is removed from the peripheral, the autostart driver ends the started application, restores the operator interface screens to a state existing prior to insertion and releases portions of random access memory that were used by the ended application. In one embodiment the autostart driver can automatically copy a new version of autostart driver software or other new software, such as word processors into the permanently installed storage media.

34 Claims, 12 Drawing Sheets

U.S. PATENT DOCUMENTS

| | | | |
|---|---|---|---|
| 3,906,197 | 9/1975 | Grover . | |
| 3,911,215 | 10/1975 | Hurst et al. . | |
| 3,959,585 | 5/1976 | Mattes . | |
| 4,022,971 | 5/1977 | Rodgers . | |
| 4,071,691 | 1/1978 | Pepper, Jr. . | |
| 4,079,194 | 3/1978 | Kley . | |
| 4,102,067 | 7/1978 | Tarrant | 40/455 |
| 4,124,888 | 11/1978 | Washburn . | |
| 4,126,760 | 11/1978 | Gordon . | |
| 4,149,029 | 4/1979 | Pobgee . | |
| 4,208,648 | 6/1980 | Naumann . | |
| 4,214,122 | 7/1980 | Kley . | |
| 4,222,188 | 9/1980 | Tarrant et al. | 40/152.1 |
| 4,286,399 | 9/1981 | Funahashi et al. | 40/124.1 |
| 4,289,925 | 9/1981 | Lambden . | |
| 4,291,303 | 9/1981 | Cutler et al. . | |
| 4,293,734 | 10/1981 | Pepper, Jr. . | |
| 4,299,041 | 11/1981 | Wilson | 40/124.1 |
| 4,313,113 | 1/1982 | Thornburg . | |
| 4,315,238 | 2/1982 | Eventoff . | |
| 4,319,078 | 3/1982 | Yokoo et al. . | |
| 4,363,081 | 12/1982 | Wilbur | 362/98 |
| 4,444,998 | 4/1984 | House . | |
| 4,455,450 | 6/1984 | Margolin . | |
| 4,484,026 | 11/1984 | Thornburg . | |
| 4,488,179 | 12/1984 | Krüger et al. . | |
| 4,497,126 | 2/1985 | Dejean | 40/124.1 |
| 4,503,286 | 3/1985 | Kubo et al. . | |
| 4,564,079 | 1/1986 | Moore et al. . | |
| 4,570,149 | 2/1986 | Thornburg et al. . | |
| 4,581,483 | 4/1986 | Ralston . | |
| 4,587,378 | 5/1986 | Moore . | |
| 4,607,747 | 8/1986 | Steiner | 206/232 |
| 4,614,266 | 9/1986 | Moorhead | 206/216 |
| 4,703,573 | 11/1987 | Montgomery et al. | 40/455 |
| 4,716,543 | 12/1987 | Ogawa et al. . | |
| 4,736,356 | 4/1988 | Konshak . | |
| 4,739,299 | 4/1988 | Eventoff et al. . | |
| 4,810,992 | 3/1989 | Eventoff . | |
| 4,855,725 | 8/1989 | Fernandez . | |
| 4,866,865 | 9/1989 | Yang | 40/455 |
| 4,884,974 | 12/1989 | DeSmet | 434/317 |
| 4,897,511 | 1/1990 | Itaya et al. . | |
| 4,920,432 | 4/1990 | Eggers et al. . | |
| 4,926,255 | 5/1990 | Von Kohorn . | |
| 4,963,702 | 10/1990 | Yaniger et al. . | |
| 4,966,285 | 10/1990 | Otake et al. . | |
| 4,990,092 | 2/1991 | Cummings | 434/317 |
| 5,008,497 | 4/1991 | Asher . | |
| 5,008,662 | 4/1991 | Takizane et al. . | |
| 5,053,945 | 10/1991 | Whisler . | |
| 5,063,698 | 11/1991 | Johnson et al. | 40/124.1 |
| 5,093,718 | 3/1992 | Hoarty et al. . | |
| 5,101,490 | 3/1992 | Getson, Jr. et al. . | |
| 5,132,992 | 7/1992 | Yurt et al. . | |
| 5,146,353 | 9/1992 | Isoguchi et al. . | |
| 5,148,419 | 9/1992 | Koguchi . | |
| 5,188,533 | 2/1993 | Wood . | |
| 5,189,237 | 2/1993 | Koguchi . | |
| 5,213,337 | 5/1993 | Sherman . | |
| 5,233,333 | 8/1993 | Borsuk . | |
| 5,235,328 | 8/1993 | Kurita . | |
| 5,245,171 | 9/1993 | Fox et al. | 235/492 |
| 5,275,285 | 1/1994 | Clegg | 206/449 |
| 5,299,181 | 3/1994 | Koguchi . | |
| 5,319,455 | 6/1994 | Hoarty et al. . | |
| 5,336,870 | 8/1994 | Hughes et al. . | |
| 5,363,487 | 11/1994 | Willman et al. . | |
| 5,419,705 | 5/1995 | Sandvik | 434/317 |
| 5,440,244 | 8/1995 | Richter et al. . | |
| 5,464,092 | 11/1995 | Seeley | 206/217 |
| 5,530,960 | 6/1996 | Parks et al. . | |
| 5,551,905 | 9/1996 | Billings et al. | 446/527 |
| 5,574,519 | 11/1996 | Manico et al. | 396/429 |

OTHER PUBLICATIONS

"TVIQ™ Remote Control Transmitter ", TVI621, TV Interactive Data Corporation, one page, believed to be prior to Jul. 1, 1994.

"Membrane Switch Products", EECO, Incorporated, 1985, 8 pgs.

"Microsoft Windows Device Driver Kit", Version 3.1, Microsoft Corporation, 1985–1992, 1–8, chapt. 11.

SyQuest, "SQ555, SQ5110 and SQ5110C , Removable Cartridge Disk Drive, Hardware Installation User's Guide," pp. i–viii, and 3–1 to 3–8, 1992.

Brochure, "Micropad", Micropad Ltd., 1981, one page.

"Analog Data Tablet", J. F. Hevesi, IBM Technical Disclosure Bulletin, vol. 23, No. 2, Jul. 1980, pp. 666–667.

"Switches, Special Advertising Section", Electronics, Jul. 12, 1984, p. SW–6.

"PC–MS DOS 4.0 for Hard Disk Users", David D. Busch, Bantam Books, 1989, pp. 27–32, 141–163.

Glaskowsky, Peter N., "PCs Head Toward Appliance Status, " Microdesign Resources, Microprocessor Report, May 6, 1996, pp. 12–14.

Thompson, M., "Advances in Passive Infrared Sensors Based on Pyroelectric Polymer Films, " Presented at the 1991 Sensors Conference, Chicago, IL, Oct. 1991, pp. 1–20.

"Amp, Summary of Operating Properties: DT1–028K", Appln. Spec. 114–1801, Aug. 1,1993, Rev. A, pp. 1–6, AMP Incorperated.

"Amp, Piezo ilm Component Design Kits," Cat. 65715, Rev. Sep. 1993, pp. 1–2, Amp. Incorporated "Amp, Piezo Film Sensors, Product Summary and Price List," Aug.1,1993, Rev. A, pp.1–4, Amp Incorporated.

"Amp, Passive Infrared Module (PIRM)", Cat 65774, Aug. 93, pp. 1–2, Amp Incorp.

"Amp, PIRL 180–100 Passive Infrared Detector", Cat. 65776, Dec. 1993, pp. 1–2, Amp Incorp.

"Amp, PIRL 180–100 Amplifier Schematic," Instruction Sheet 408–9950, Aug. 1,1993, 1 page, Amp Incorp.

"Amp, Passive Infrared Sensor Design Tips, "Appln. Note 65753, Aug. 1,1993, Rev. A., pp. 1–2, Amp Incorp.

Sensory Inc., "RSC–164, Recognition • Synthesis • Control," From the *Interactive Speech*™ Line of Products, © 1995 Sensory Inc. 8 pages.

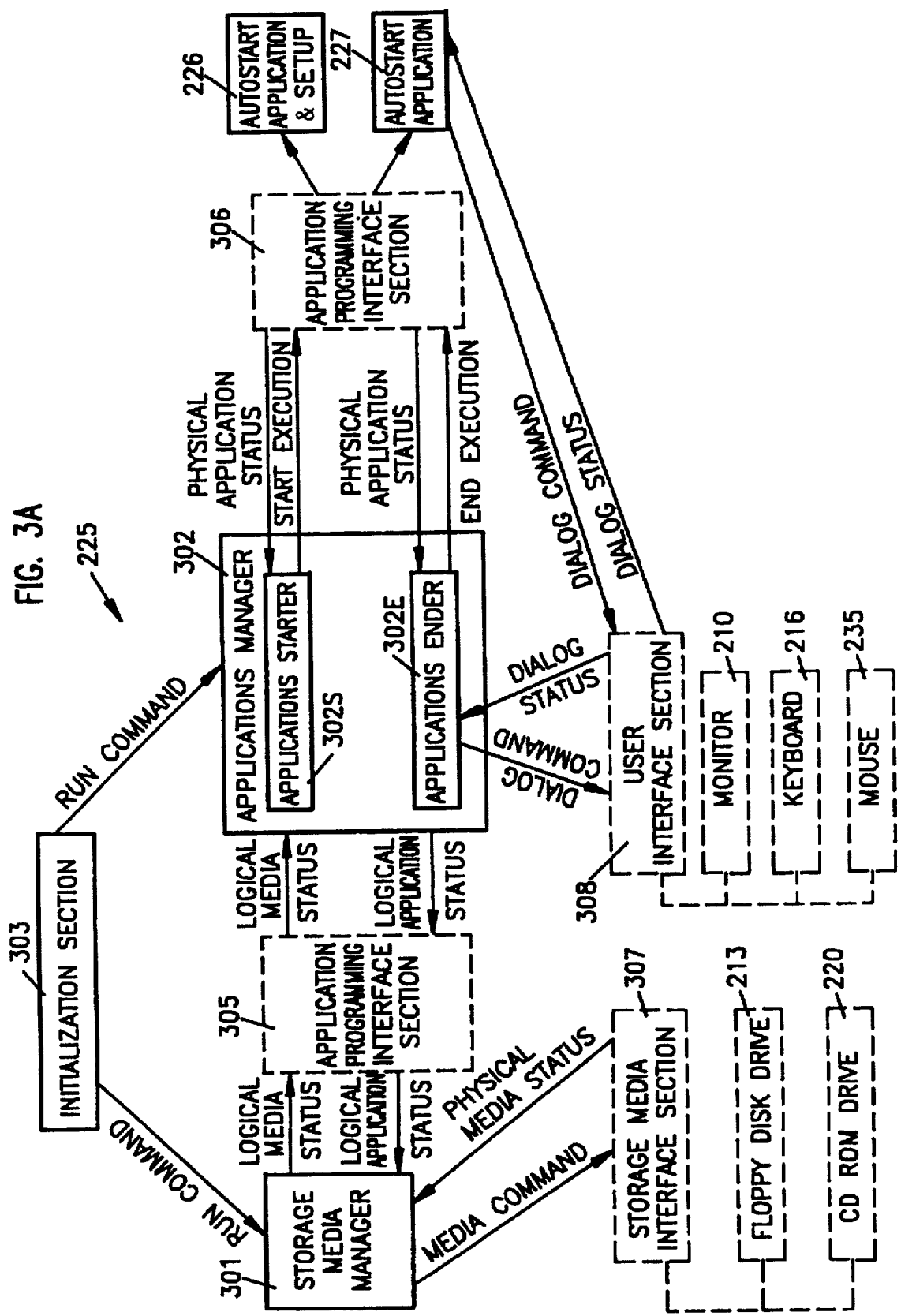

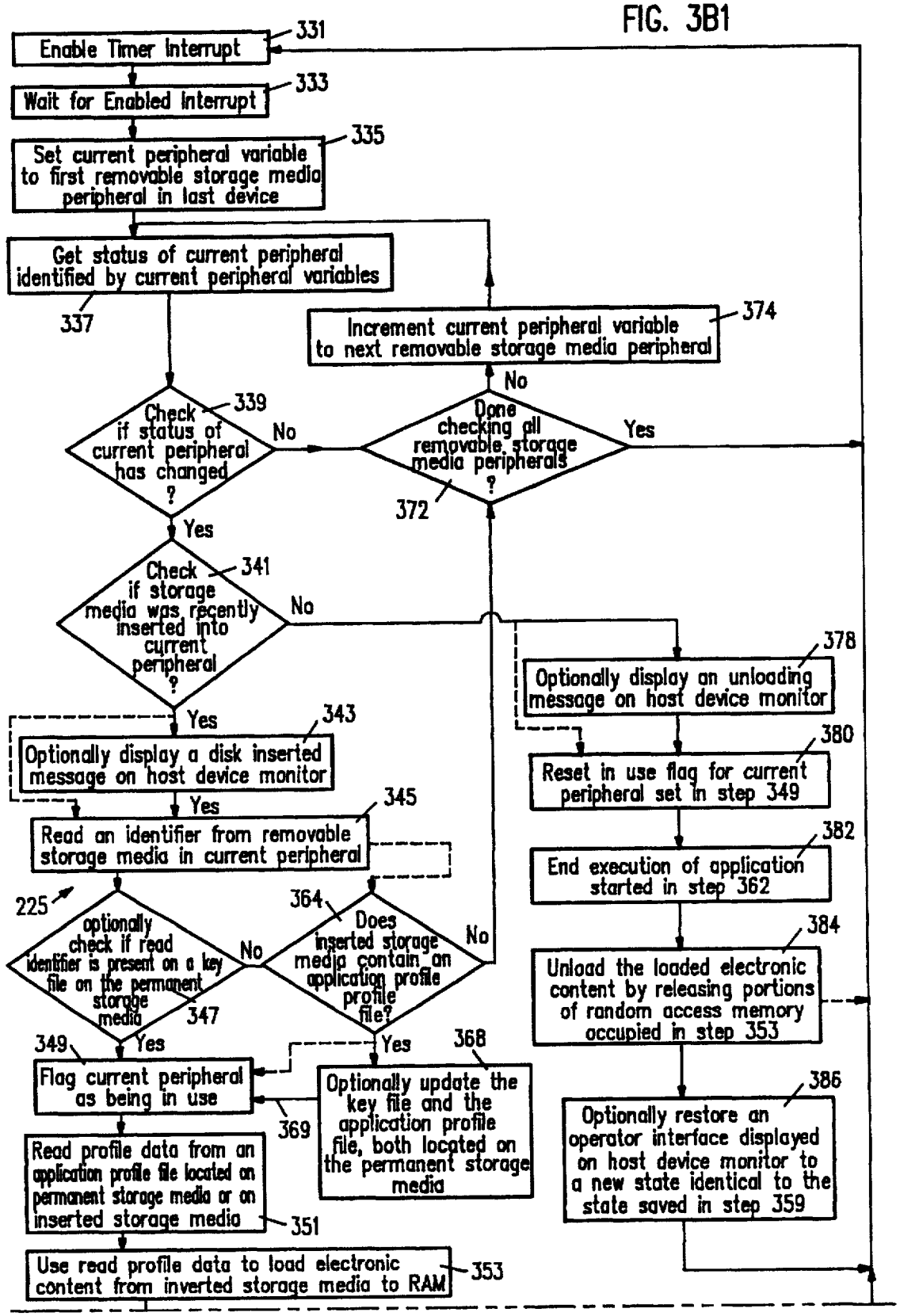

FIG. 3B2

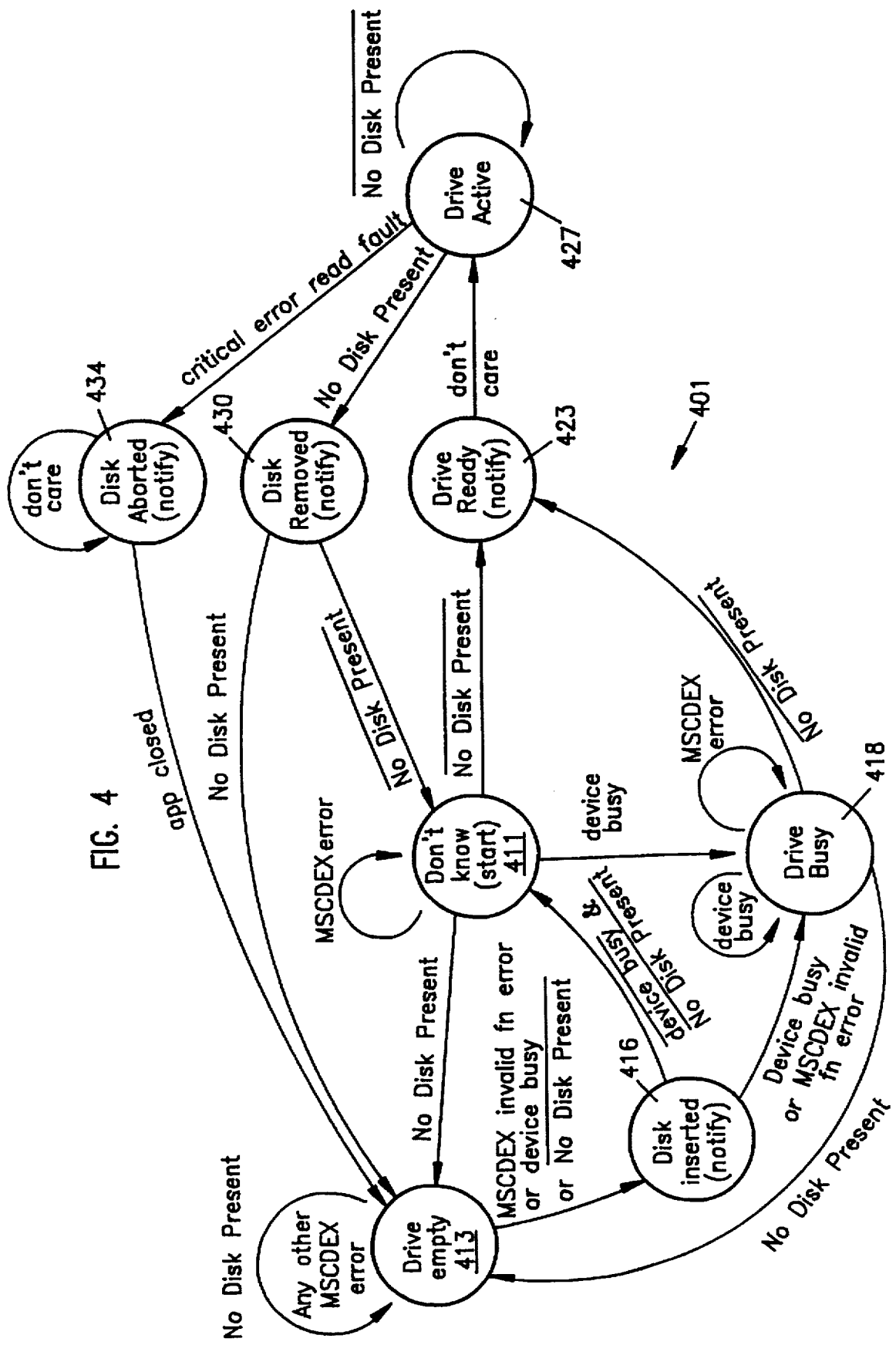

1

METHOD FOR AUTOMATICALLY STARTING EXECUTION AND ENDING EXECUTION OF A PROCESS IN A HOST DEVICE BASED ON INSERTION AND REMOVAL OF A STORAGE MEDIA INTO THE HOST DEVICE

CROSS REFERENCE TO RELATED APPLICATION

This application is a continuation-in-part application of the U.S. patent application Ser. No. 08/269,492 by Peter M. Redford and Donald S. Stern, assigned to the same assignee as the present application, filed Jul. 1, 1994, and entitled "AN INTERACTIVE BOOK, MAGAZINE AND AUDIO/VIDEO COMPACT DISK BOX" which is incorporated by reference herein in its entirety.

CROSS REFERENCE TO MICROFICHE APPENDIX

Microfiche Appendices A–F are parts of the present disclosure and each appendix consists of one sheet of microfiche having respectively 62, 17, 13, 12, 8 and 28 frames. Microfiche Appendices A–F list source code of computer programs and related data of an illustrative embodiment of an autostart driver for use in an industry standard 386 microprocessor based IBM™ Personal Computer or clone running Microsoft™ Windows Operating System.

Specifically, microfiche Appendix A includes low level assembler code for a storage media manager, that can be assembled using the MASM assembler, version 5.10B available from the Microsoft Corporation, to form a virtual device driver file "DISGO.386". Microfiche Appendix B includes high level C code for an applications manager, that can be compiled using a C++ compiler, version 1.5 available from the Microsoft Corporation, to form an executable file "DISGO.EXE". Microfiche Appendix C includes macros and data structure definitions that are used in a dynamic link library (DLL) that is included in microfiche Appendix F described below. Microfiche Appendix D includes subroutines and data structure definitions that are used by the low level assembler code included in microfiche Appendix A described above. Microfiche Appendix E includes initialization code and subroutines used by the dynamic link library code included in microfiche Appendix F described below. Microfiche Appendix F includes in-line assembler code and C code that form the dynamic link library used by the storage media manager and the application manager described above, and can be compiled using the C++ compiler described above, to form a library file "DISGO.DLL".

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

This invention relates in general to an apparatus and method for automatically starting and ending processes in a host device on occurrence of an external event. In particular, this invention relates to an apparatus and method for automatically starting a process in response to insertion of a removable storage media, such as a compact disk (CD-ROM) into a peripheral of the host device and automatically ending the started process in response to removal of the inserted storage media.

DESCRIPTION OF RELATED ART

Today's multimedia devices have sophisticated digital sound and full motion video capabilities which make such devices very suitable for entertainment and educational applications in users' homes. The contents of many printed books are now commercially available as multimedia books and applications encoded in CD-ROMs. Unfortunately, using a multimedia book or application on a host device is not simple at all.

Most of today's multimedia books lack the feel of printed books and cannot easily be categorized as books on a bookstore shelf. Children, the main targets of multimedia books, usually cannot use such books without adult help. Today's multimedia books have the feel and ease of use of ordinary computer programs. A significant level of computer knowledge is required to "read" a multimedia book, typically by using input devices such as a mouse, computer keyboard or game controller.

For example, to use a CD-ROM based multimedia book, the user must do the following on an IBM PC host device:
1. Start the Windows operating environment;
2. Insert the CD-ROM into the drive;
3. Find the appropriate icon and double click on the icon, or,
   If the icon is not available, use the File Manager's menu to select "File" and "Run" and then type the name of the executable file such as "WP", followed by the Enter key.

The above procedure is not simple for anyone other than experienced Windows users. A similar procedure must be followed for a Macintosh host device.

Although in using a game platform such as 3DO platform or a Sega platform it is considerably simpler to start an application, the user is required to toggle the power switch after insertion of a game cartridge, which can be a significant task for a two year old child. A similar toggling of power switch or pressing the reset button is required for boot-up diskettes for personal computers. Such toggling of power switch or reset button forces a user to wait for the personal computer or game platform to go through the boot-up sequence which can last for typically 20 seconds or more. Moreover, the user must know that merely inserting a CD-ROM into a peripheral is not enough and that some button must be toggled or pressed. Also, the user must know the specific button on the host device such as a power switch or a reset switch.

Although some host devices automatically check a disk drive for a file of commands to be run, such checking is done only during power up for booting the operating system. Once a host device has been powered up and is running the operating system, the user must insert a disk encoded with instructions for an application and manually start the application (for example by clicking the mouse on an icon or by typing commands such as "MSINSTR"). Also, there can be some delay after insertion of a storage media, while the storage media is being electrically coupled to the host device, which delay is frustrating to a user due to lack of indication of status. Finally, a host device can go into an undesirable and unknown state if an inserted disk is prematurely removed, for example, before the application ends.

SUMMARY OF THE INVENTION

In accordance with this invention, an autostart driver that is installed in a host device automatically starts and stops applications respectively in response to insertion and removal of a removable storage media. Specifically, on finding a storage media in a local peripheral of the host device, one embodiment of the autostart driver checks the inserted storage media for a file of a first predetermined name. If the file of the first predetermined name exists, the autostart driver in this embodiment automatically executes the file which in turn starts the appropriate application. The application can automatically display the title screen on the monitor of the host device, as soon as the application starts.

Therefore when the autostart driver is installed in a host device, compatible applications start up automatically, as soon as a storage media is inserted into the drive. Automatic start-up of an application on insertion of a storage media allows even pre-school children to use applications encoded on a storage media without adult supervision. Therefore using an interactive media in accordance with this invention is made as simple as playing a video cassette recorder (VCR) tape, and even pre-school children can "read" interactive media without adult supervision.

In another embodiment to this invention, the autostart driver is similar to the embodiment described above, except for the following differences. The autostart driver initially checks a permanently installed storage media, such as a hard disk, for a key file of a first predetermined name. If a key file exists in the permanently installed storage media, the autostart driver checks if an identifier read from the inserted storage media, such as a volume identifier, is included in the key file. Then, the autostart driver reads application profile data corresponding to the read identifier from an application profile file of a second predetermined name (either on the hard disk or on the inserted storage media), loads a file from the inserted storage media into random access memory and starts execution of an application using the loaded file. The loaded file can contain code or data or both code and data used by the application.

If the autostart driver of this embodiment fails to find a key file of the first predetermined name on the permanently installed storage media, the autostart driver checks the inserted storage media for an application profile file of the second predetermined name. If an application profile file of the second predetermined name exists on the inserted storage media, the autostart driver of this embodiment can add the volume identifier of the inserted storage media to the key file of the first predetermined name and copy the contents of an application profile file of the second predetermined name from the removable storage media into an application profile file of the second predetermined name in permanently installed storage media, and then start an application as described above.

Therefore, this embodiment of the autostart driver allows applications encoded on preexisting storage media to be made compatible with the autostart driver, by adding records containing the application profile data needed to start these applications into the file of the second predetermined name on the permanently installed storage media. Such additions to the application profile file of the second predetermined name can be made by a user, or alternatively by an installation program. In such a case, the storage media's identifier must be inserted into the key file of the first predetermined name.

If the autostart driver of this embodiment fails to find a permanently installed storage media (for example in a game machine type host device), then the autostart driver skips the optional steps described above in regards to the permanently installed storage media, and automatically starts an application on finding an application profile file of the second predetermined name on the inserted storage media.

In one embodiment, the autostart driver checks if a new version of the autostart driver software is present on an inserted storage media. If so, the autostart driver copies to a hard disk the new version of the autostart driver software over a current version of the autostart driver software. In one embodiment, the autostart driver software can restart itself to use the new version of the software.

In one embodiment, the autostart driver includes a storage media manager that periodically or asynchronously determines status of various removable storage media peripherals of the host device, and an applications manager that starts and stops applications in response to logical media status signals from the storage media manager. Specifically, the applications manager includes an applications starter that drives a start execution signal in response to a logical media status signal indicating insertion of a removable storage media containing information compatible with the autostart driver into a removable storage media peripheral. The applications manager also includes an applications ender that drives an end execution signal in response to a logical media status signal indicating removal of a previously inserted storage media.

BRIEF DESCRIPTION OF THE DRAWINGS

FIG. 3A illustrates various parts of one embodiment of an autostart driver for use in the host device of FIG. 2.

FIG. 3B illustrates a flow chart of various parts of the autostart driver of FIG. 2.

FIG. 4 illustrates state transitions of a removable storage media peripheral in one embodiment of an autostart driver.

DETAILED DESCRIPTION

Figure 1A:
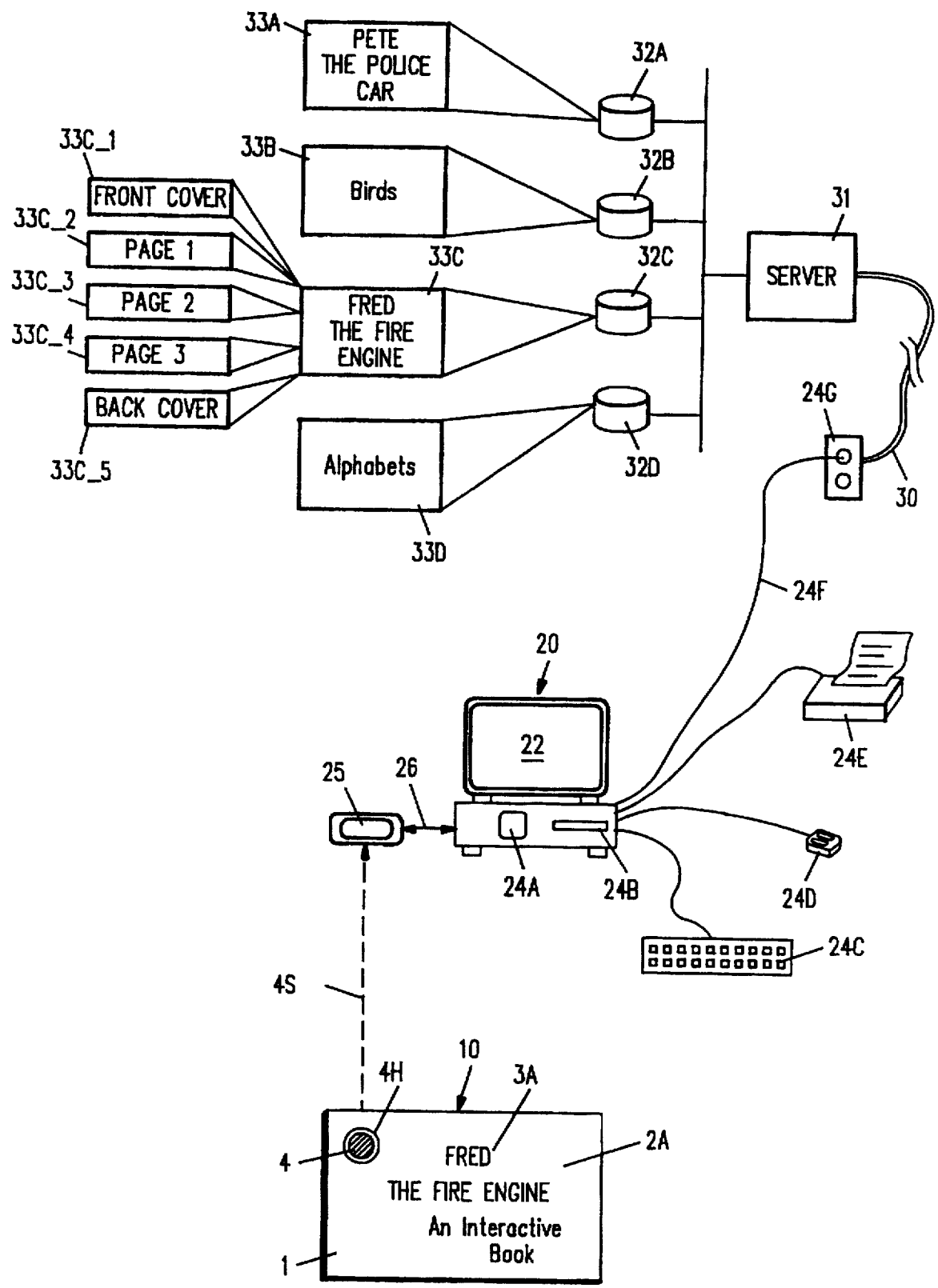
FIGS. 1A and 1B illustrate in block diagrams two embodiments of a host device in accordance with this invention.

As used herein, the term "host device" is intended to mean any device which can display to the user associated electronic content encoded in remote and/or local storage media. The host device can be equipped with a peripheral suitable for retrieving associated electronic content encoded in a local storage media. Examples of such a peripheral include a CD-ROM drive, a floppy drive, a hard drive, a tape drive and a PCMCIA card peripheral. Also, the host device can be equipped with communications hardware and software suitable for retrieving electronic content encoded in a remote storage media through a remote server. In different embodiments of this invention, a host device can be any IBM personal computer (or clone), Macintosh computer, 3DO platform, Sega platform, an interactive television set top, a video CD player, and a video tape player.

As used herein, the term "storage media" is intended to mean media for storing digital data and/or code such as optical disks (for example compact disks (CDs)), flexible disks (for example 5 ¼ floppy disks), rigid disks (for example hard disks), tapes, game cartridges, memory cards (for example PCMCIA card) or any other media suitable for use in a host device. The term storage media includes such structures and any other structure which performs the function of information storage.

In one embodiment the storage media is removable from a host device although other storage media (for example in a local hard drive or a remote hard drive on a remote server) can also be used in accordance with this invention.

In accordance with this invention, electronic content can include selections which in turn can contain information found in a conventional printed publication such as book, magazine, catalog or other printed document. As used herein, the term "selection" is intended to mean data and/or code and includes a grouping or combination of one or more files such as software, still graphics, picture, text, audio recording, video recording or other data related to one another, suitable for display by a host device. For example, a selection can include the multimedia equivalent of a magazine article or a television program or a digitized song or a video game software program or a spread sheet for financial information. While in one embodiment, data and/or code selections are in multimedia form suitable for use in a multimedia host device, a single media host device can also be used with suitable selections in accordance with this invention.

As used herein, the term "category" is intended to mean one or more selections which have some common characteristic. Examples of categories are "fish" and "birds". A fish category can contain selections of audio and/or video recordings and text captions relating to, for example, 200 different fish. Another example of a category is a "rock and roll music" category encoded on audio CD, the audio CD containing 20 selections of music, each music selection being representative of rock and roll music.

As used herein, the term "application" is intended to include but is not limited to code and/or data which interprets button codes from a remote control. Applications run on host devices. Applications can include selections or alternatively selections and applications can be distinct entities. In one embodiment of this invention applications are distributed to users on storage media. In one specific embodiment of this invention, an application and associated selections are all integrated into a single executable (such as a file BUSWEEK.EXE). In an alternative embodiment of this invention, applications for retrieving and displaying selections are distributed to users independent of the storage media containing the selections. Applications and/or selections can also be distributed to users and accessed by a host device through various communication channels such as phone lines, TV cable and/or satellite link.

An application includes code which interacts with the user regardless of whether the code is created using a high level presentation development system or is hard coded using a programming language such as C. Furthermore, an application can include either a small run time engine or a larger presentation development software for displaying multimedia selections. An application and/or selection can reside on removable local storage media and/or the host device's permanently installed storage media and/or a remote server. In other alternative embodiments, a part of the application is resident in the host device, and another part is resident on a remote server's storage media and/or a local storage media.

As used herein, the term "display" is intended to mean presenting one or more selections by the host device in a form suitable for use by a human on a display device such as a monitor/screen, a speaker/headset or a printer. Display includes running a software program, playing a sound recording (through a speaker/headset), showing a video recording (on a monitor/screen) and printing a graphics image (on a printer). As used herein, the term "use" is intended to be more than mere display and includes any use whatsoever in a host device.

A picture book remote control 10 (FIG. 1A) can be used with host device 20 as described in detail in the above referenced U.S. patent application Ser. No. 08/269,492. Host device 20 (FIG. 1A) is an IBM compatible personal computer (PC) equipped with a monitor 22, a speaker 24A, a CD drive 24B, a keyboard 24C, a mouse 24D, a printer 24E and, a cable/wire 24F connected to a jack 24G.

In one specific embodiment of this invention, host device 20 (FIG. 1A) is an IBM compatible personal computer from Astrix Computer Corporation, 1546 Centre Pointe Drive, Milpitas, Calif. 95035. Host device 20 includes multimedia hardware such as a full motion video card, "Real Magic" available from Sigma Designs, Inc., 47900 Bayside Parkway, Fremont, Calif. 94538. The Real Magic card implements an audio/video compression algorithm compatible with MPEG/1 specification available from the Motion Pictures Expert Group. Host device 20 also includes a commercially available CD drive, NEC CDR/84 available from NEC Corporation. In an alternative embodiment of this invention, host device 20 includes the full motion video card "ProAudio Spectrum 16" available from Media Vision Inc., 47300 Bayside Parkway, Fremont, Calif. 94538.

In another embodiment of this invention, host device 20 can be, for example, a Macintosh personal computer (PC) equipped with a monitor, a floppy drive, a speaker, a headset, a signal receiver, a CD drive and a keyboard.

Figure 1B:
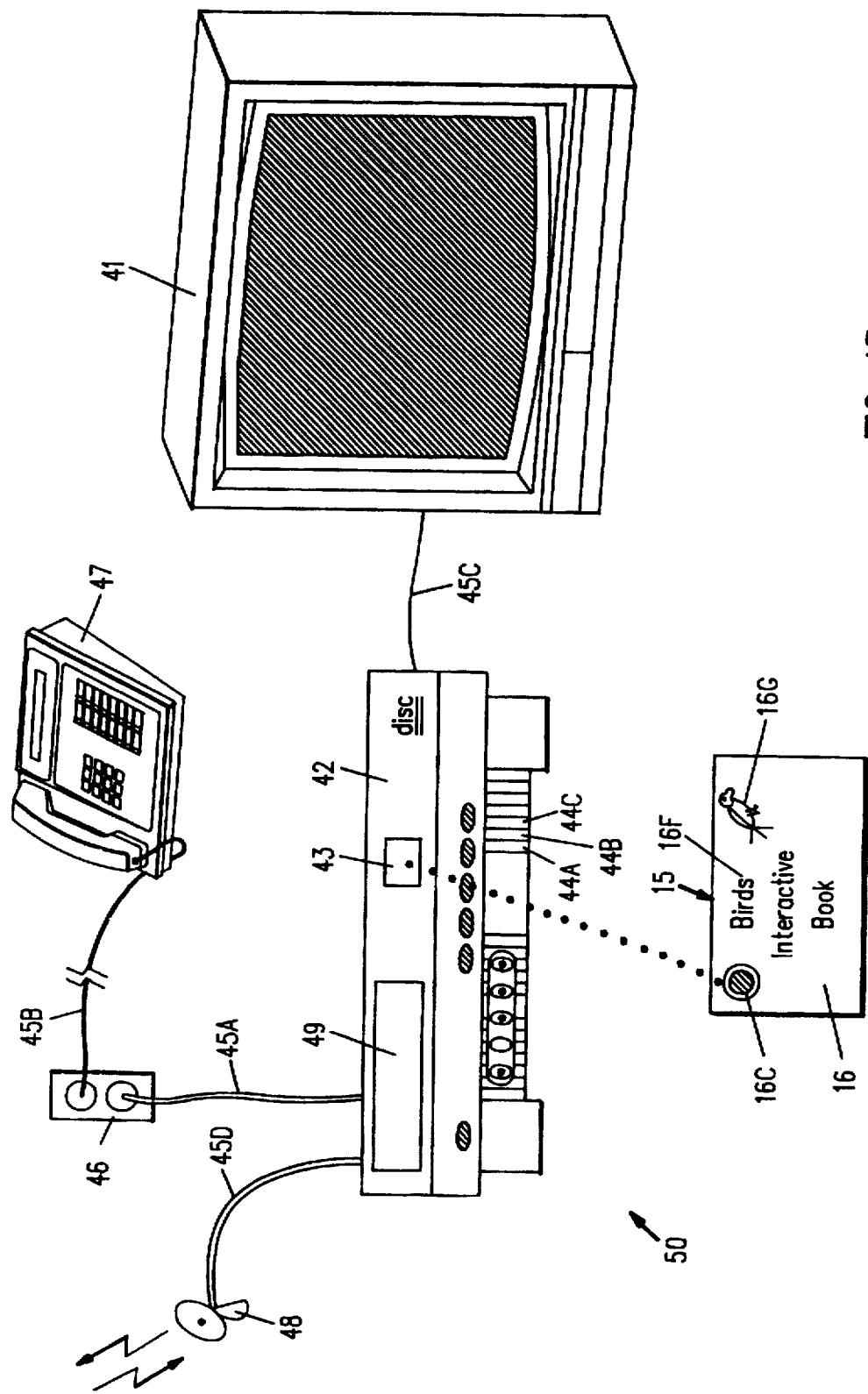

FIG. 1B shows a picture book remote control 15 used with a host device in the form of a game machine platform 50. Game machine platform 50 includes a television 41, which has a screen (also called a "monitor"). Game machine platform 50 also includes a game machine 42 connected to television 41 by a cable 45C. Game machine 42 includes a built-in receiver 43, a modem 44A, a fax card 44B, a battery protected memory card 44C and game cartridge receiver 49. Game cartridge receiver 49 is suitable for retrieving the electronic contents encoded in a game cartridge.

Although a game machine 42 is being described and shown in FIG. 1B, other host devices such as an interactive television set top can be used instead of game machine 42 in accordance with this invention.

In one embodiment of this invention, a user can place a storage media (such as a CD-ROM) into a compatible peripheral of a powered up and booted host device (such as host device 20) running an operating system and automatically retrieve selections encoded in the storage media using a remote control without touching any keys or switches of the host device. To facilitate automatic detection of insertion of a storage media, a host device is installed during booting with an autostart driver which periodically polls one or more peripherals of the host device. In an alternative embodiment, the autostart driver is invoked by an interrupt from a removable storage media peripheral which interrupt can be caused by insertion of a storage media into the peripheral.

In one embodiment of this invention, all host devices are configured with an autostart driver (described below). The autostart driver is installed during the start up of a host device such as host device 20 by inserting an instruction to install the autostart driver in a file "CONFIG.SYS" in a boot disk of host device 20. For example, the instruction "DEVICE=C:V6.000AUTOSTRT.SYS" can be inserted in CONFIG.SYS for an IBM PC host device.

Figure 1C:
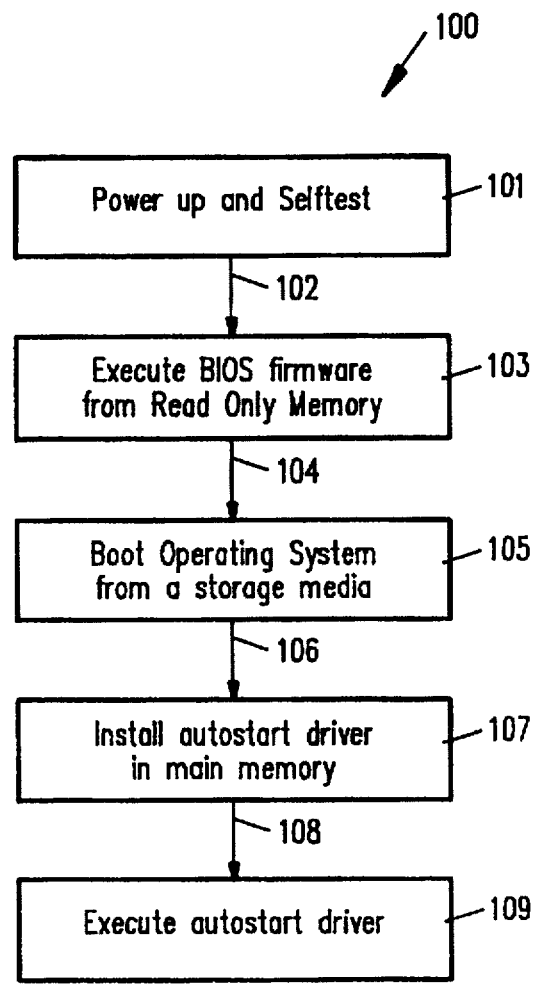
FIGS. 1C–1E illustrate in flow charts two embodiments of an autostart driver running in a host device.

In one embodiment of this invention, a host device 20 (FIG. 1A) executes step by step each instruction illustrated by flow chart 100 of FIG. 1C. When a user turns on the power to host device 20, host device 20 powers up and performs self test in step 101. Then host device 20 goes via branch 102 to step 103 where host device 20 executes firmware encoded in a read only memory also called ROM on the mother board of host device 20. Then host device 20 goes via branch 104 to step 105 where host device 20 boots the operating system from a storage media, wherein the storage media containing the operating system can be either a removable storage media (such as a floppy disk) or a permanently installed storage media which is an integral part of host device 20 (such as a hard drive). During booting, host device 20 checks for initialization files such as startup files and configuration files. On finding a valid initialization file, host device 20 uses the initialization file during booting. Then host device 20 goes via branch 106 to step 107 where host device 120 installs an autostart driver in main memory e.g. random access memory also called RAM or a read only memory also called ROM 35. Then host device 20 goes via branch 108 to step 109 where host device 20 executes the instructions coded in the installed autostart driver.

Although not shown in FIG. 1C, host device 20 can execute several instructions unrelated to installing an autostart driver at various points not shown in flow chart 100 (such as within branch 106 to install other drivers and within branch 108 to execute other drivers).

In one embodiment of this invention, an autostart driver in host device 20 detects insertion of a storage media and upon detection of a storage media (such as a CD-ROM) in a peripheral, seeks a file having a first predetermined name, such as the unique symbol DISGO™. A predetermined name is any name which is determined ahead of time and which is consistently used in the autostart driver and also in compatible storage media. In one embodiment of this invention, files with first and second predetermined names (such as DISGOKEY.EXE and DISGO.BAT) are present in a set of storage medias released by licensees of the owner of this patent. At the very least, a file with second predetermined name (such as DISGO.BAT) must be present on a storage media to be compatible with an embodiment of the autostart driver which seeks a file of the second predetermined name DISGO.BAT.

In this embodiment, every file having the second predetermined name (such as DISGO.BAT) contains a sequence of application start-up instructions to be executed to start an application for using selections encoded in the inserted storage media.

Application start-up instructions include for example the instruction to (1) start an application either from the inserted storage media or alternatively from a permanently installed storage media in the host device or in a remote server, (2) access a specified location on the inserted storage media, (3) retrieve and display certain selections contained at a location on the storage media, and/or (4) execute certain application instructions located in memory of the host device or in the storage media.

Prior to starting an application, the autostart driver can seek to identify a security key to ensure authenticity of the storage media and then execute the sequence of application start-up instructions once the security key has been correctly identified. For example, the key could be a uniquely identifiable encoding in the inserted storage media of a copyright notice in file of a first predetermined name such as, DISGOKEY.EXE.

Figure 1D:
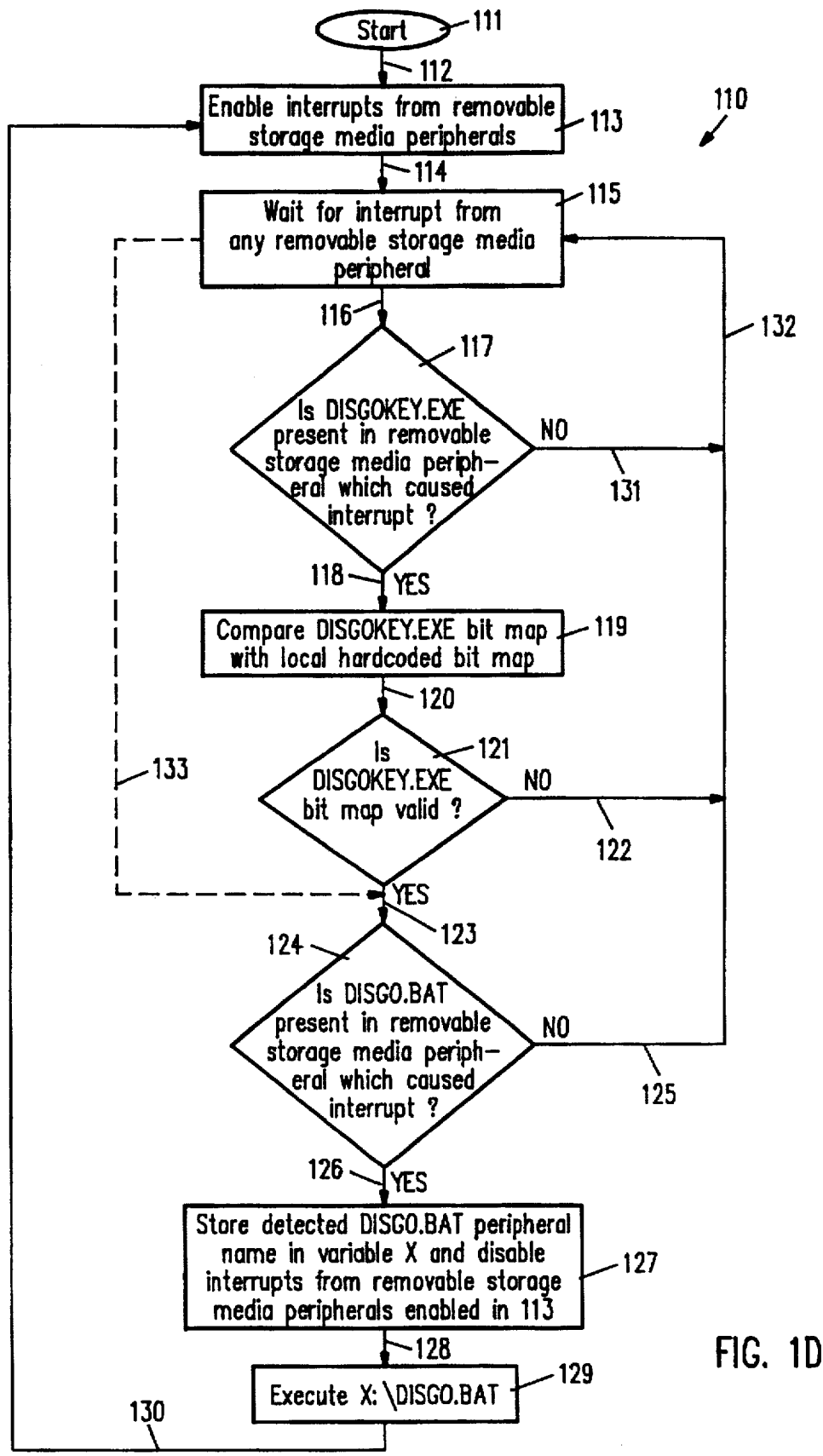

FIG. 1D is a flow chart of one embodiment of an autostart driver 110 running on microcomputer of a host device 20. Autostart driver 110 at first initializes variables in step 111 and goes via branch 112 to step 113. In step 113, autostart driver 110 enables interrupts from removable storage media peripherals. A removable storage media peripheral is any peripheral of a host device into which a storage media can be removably and repeatedly inserted and withdrawn, for example drive A, drive B and a CD drive of an IBM PC host device 20.

Then autostart driver 110 goes via branch 114 to step 115. In step 115, autostart driver 110 waits for an interrupt from a removable storage media peripheral. Then on receipt of an interrupt, autostart driver 110 goes via branch 116 to decision box 117. In decision box 117 autostart driver 110 checks to see if a key file of a first predetermined name DISGOKEY.EXE is accessible from the removable storage media peripheral which caused the interrupt. If key file DISGOKEY.EXE is not accessible, autostart driver 110 goes via branches 131 and 132 back to step 115 (described above).

If key file DISGOKEY.EXE is accessible in the removable storage media peripheral which caused the interrupt, autostart driver 110 goes via branch 118 to step 119. In step 119, autostart driver 110 checks to see if a security key is present in a key file of a first predetermined name on the storage media. For example, autostart driver 110 opens the key file of first predetermined name, DISGOKEY.EXE and compares the bitmap in DISGOKEY.EXE with a bitmap locally hard coded in autostart driver 110. Then autostart driver 110 goes via branch 120 to decision box 121.

In decision box 121 autostart driver 110 checks if the bitmap in key file DISGOKEY.EXE was valid. If the bitmap in key file DISGOKEY.EXE was invalid, autostart driver 110 goes via branches 122 and 132 back to step 115 (described above). Alternatively if DISGOKEY.EXE bitmap is valid, autostart driver 110 goes via branch 123 to decision box 124.

In decision box 124, autostart driver 110 checks to see if an application profile file of a second predetermined name DISGO.BAT is accessible from the removable storage media peripheral which caused the interrupt. If application profile file DISGO.BAT is not accessible, autostart driver 110 goes via branches 125 and 132 back to step 115 (described above). If application profile file DISGO.BAT is accessible in the removable storage media peripheral which caused the interrupt, autostart driver 110 goes via branch 126 to step 127.

In step 127 autostart driver 110 stores the peripheral name in which application profile file DISGO.BAT was found and in which key file DISGOKEY.EXE was found valid into a variable X. For example, autostart driver 110 can store the drive letter A in variable X if a removable storage media containing application profile file DISGO.BAT and a valid key file DISGOKEY.EXE is inserted in drive A of IBM PC host device 20.

Then autostart driver 110 disables the interrupt that was enabled in step 113. The disabling of interrupts allows autostart driver 110 to execute an application for example without being interrupted by user insertion of a removable storage media into another peripheral. Then autostart driver 110 goes via branch 128 to step 129. In step 129 autostart driver 110 executes the command X:DISGO.BAT which executes instructions in application profile file DISGO.BAT of the removable storage media inserted by a user into the peripheral of host device 20. The application started by execution of application profile file DISGO.BAT in turn loads into main memory at least a portion of the software of the application encoded on the inserted storage media and then passes control to the application.

Once the application has terminated, control returns from the application to step 129 of autostart driver 110. Autostart driver 110 goes via branch 130 back to step 113 (described above) which allows autostart driver 110 to continue to be responsive to the insertion of a storage media into a peripheral of host device 20.

In another embodiment of this invention, in step 129, instead of the autostart driver executing the instructions in DISGO.BAT as shown in FIG. 1D, the autostart driver starts up or spawns a new process which executes the instructions in DISGO.BAT.

When autostart driver 110 fails to find a DISGO.BAT or fails to find a DISGOKEY.EXE or if DISGOKEY.EXE bitmap is invalid, autostart driver 110 returns to step 115 (as noted above) so that a user can invoke other applications encoded on a removable storage media in the conventional manner, thus bypassing the automatic startup feature provided by autostart driver 110.

In an alternate embodiment of this invention, an autostart driver 110 skips steps 117, 119 and 121 in which a security key is checked. In such an embodiment, autostart driver 110 goes from step 115 via branch 133 (shown dotted) to step 123.

Autostart driver 140 (FIG. 1E) is an embodiment similar to autostart driver 110 except that instead of setting up and waiting on interrupts from removable storage media peripherals, autostart driver 140 sets up a timer interrupt and waits on the timer interrupt, thereby periodically checking the peripherals of a host device, such as host device 20.

Autostart driver 140 initializes variables in step 141 and goes via branch 142 to step 143. In step 144, autostart driver 140 sets a timer period to one second. Then autostart driver 140 goes via branch 144 to step 145. In step 145 autostart driver 140 enables the timer interrupt.

Then autostart driver 140 goes via branch 146 to step 147. In step 147 autostart driver 140 waits for the enabled timer interrupt. Then autostart driver 140, on receiving an interrupt from the timer (which occurs after one second, the timer period set in step 143), autostart driver 140 goes via branch 148 to step 149. In step 149, autostart driver 140 sets the current peripheral variable to the name of the first removable storage media peripheral in host device 20. Then autostart driver 140 goes via branch 150 to decision box 151. In decision box 151 autostart driver 140 checks to see if the key file DISGOKEY.EXE is present in the peripheral having the name in the current peripheral variable. If autostart driver 140 is unsuccessful (either because a storage media is not present in the current peripheral or the key file DISGOKEY.EXE is not present in the storage media) then autostart driver 140 goes via branch 152 to decision box 153.

In decision box 153 autostart driver 140 decides whether all removable storage media peripherals of host device 20 have been checked during the current timer interrupt. If autostart driver 140 finds that not all the removable storage media peripherals have been checked, autostart driver 140 goes via branch 154 to step 155. In step 155 autostart driver 140 increments the current peripheral variable by setting the peripheral name of the next removable storage media peripheral to the current peripheral variable. Then autostart driver 140 goes via branch 156 and 150 back to decision box 151 (described above). If all of the removable storage media peripherals have been checked in decision box 153, then autostart driver 140 goes via branch 171 to step 147.

If key file DISGOKEY.EXE was found by autostart driver 140 in decision box 151, autostart driver 140 goes via branch 157 to step 158. Step 158, branch 159 and decision box 160 are similar to step 119, branch 120 and decision box 121 (described above in reference to FIG. 1D). If autostart driver 140 is unsuccessful in decision box 160, autostart driver 140 goes via branch 161 to decision box 153 (described above). If autostart driver 140 is successful in decision box 160, autostart driver 140 goes via branch 162 to decision box 163. In decision box 163, autostart driver 140 checks if application profile file DISGO.BAT is present in the current peripheral. If autostart driver is unsuccessful in decision box 163, autostart driver 140 goes via branch 164 to decision box 153 else autostart driver 140 goes to step 166 via branch 165.

In step 166 autostart driver 140 stores the name of the peripheral in which application profile file DISGO.BAT was found in variable X and disables the timer interrupt enabled in step 135. Then autostart driver 140 goes via branch 167 to step 168 which is similar to step 129 (FIG. 1D). Once the application has completed, and control has returned to autostart driver 140, autostart driver 140 goes via branch 169 to step 145 described above.

In an alternative embodiment of autostart driver 140, decision box 151, step 158 and decision box 160 are skipped by using branch 170 (shown dotted) to go from step 149 to step 163.

Figure 1E:
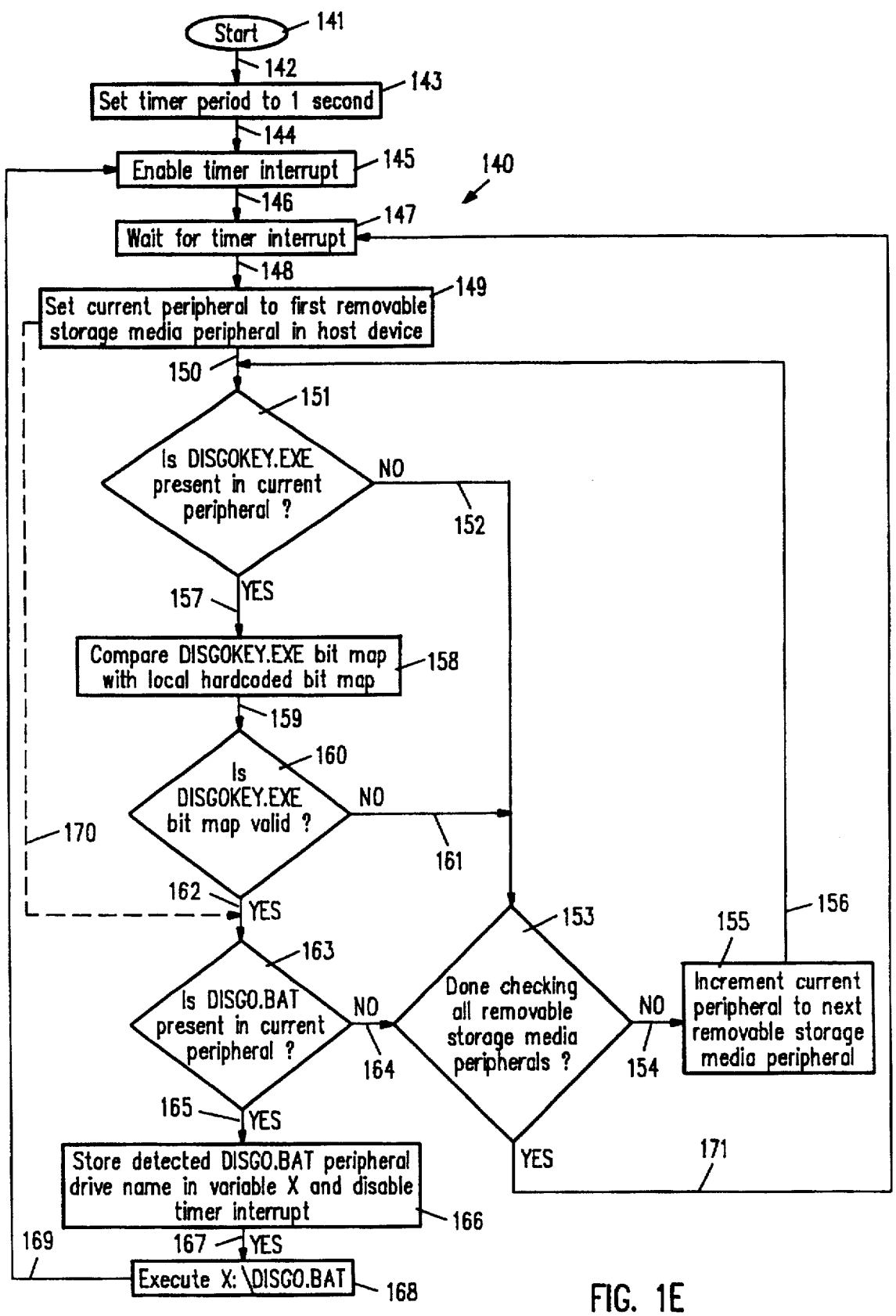

Although in FIGS. 1C, 1D and 1E, the host device is shown being configured with an autostart driver which is a separate executable image, the instructions to a host device shown in FIG. 5A, 5B and 5C can be issued in other forms suitable for the host device (such as commands to the operating system).

Although in one embodiment of this invention, the autostart driver includes instructions executed by a central processing unit, in an alternative embodiment, the host device includes a first hardwired logic which detects insertion of a storage media into a peripheral. A second hardwired logic checks the inserted storage media for a file of a first predetermined name and compares a bitmap in the file with a bitmap stored in a read only memory. In another embodiment, there is a third hardwired logic which checks for a file of a second predetermined name. In one specific embodiment of this invention, the first, second and third hardwired logics are all included in the peripheral's hardware and generate an autostart interrupt to the central processing unit on a successful result. On receipt of the autostart interrupt, the central processing unit executes the file of the second predetermined name from the peripheral which generated the autostart interrupt.

Figure 1F:
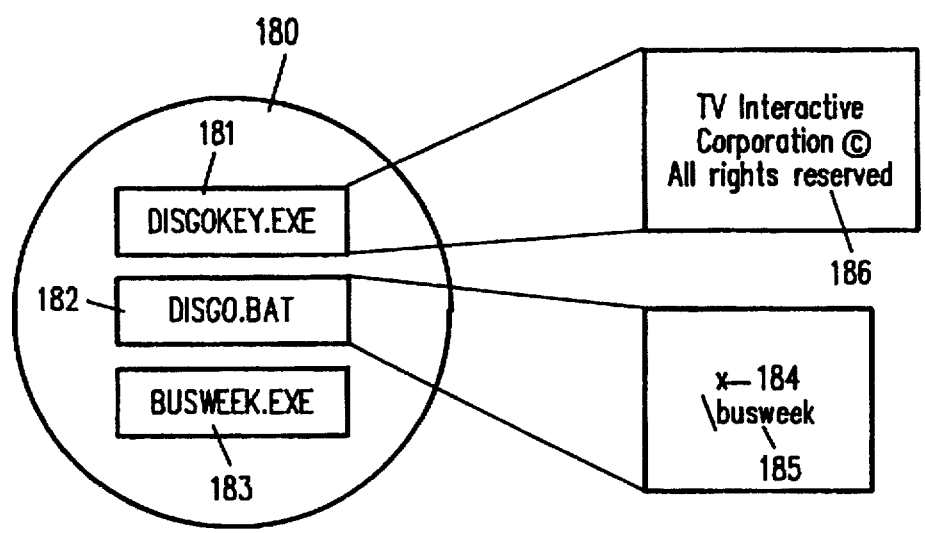
FIG. 1F illustrates a storage media, such as a CD that is encoded with files for use by the two embodiments of an autostart driver illustrated in FIGS. 1C–1E.

FIG. 1F shows the contents of the application profile file with second predetermined name DISGO.BAT which is invoked in step 124 by autostart driver 110 and in step 163 by autostart driver 140. Application profile DISGO.BAT contains the operating system command 174 which reads "X:" Operating system command 174 changes the current default drive to the drive in which a storage media has been inserted. The next command in application profile DISGO-.BAT is operating system command 175 which reads "busweek". Operating system command 175 initiates the running of an application encoded as BUSWEEK.EXE 431.

While in one specific embodiment of this invention, the application is encoded as BUSWEEK.EXE, other file names (such as FIREBOOK.EXE) can be used for an application so long as the same name is consistently used in operating system command 163 in application profile file with second predetermined name DISGO.BAT (which contains the application startup instructions which start the application for using selections on the inserted storage media).

Therefore when an autostart driver is installed in a host device, this invention allows applications encoded in compatible storage media (as described above) to start up automatically without any additional user input, soon after a storage media is inserted into a peripheral of the host device. Therefore once a host device is powered up, booted and installed with an autostart driver, a user need not touch any keys or switches of a host device, and can merely insert a storage media to start an application in accordance with this invention.

FIG. 1F also illustrates a copyright notice 164 which is used as a security key bitmap and which is compared with an identical copyright notice bitmap locally hard coded in autostart drivers 110 and 130.

One advantage of the autostart driver of this invention is that the user need not have any computer knowledge to start an application. Pre-school children can now enjoy interactive media without even toggling a power switch (for example, merely inserting a storage media into a host device). An autostart driver can be used to automatically start various applications such as spreadsheet application LOTUS 1-2-3™ and word processing application Word Perfect™ if so programmed.

An automatically started application can also be an application 870 (described below in reference to FIG. 3D) for displaying selections encoded on a storage media, such as a software program which stores and manipulates many types of data including: graphics files for the pictures, text files for the captions, sound files for captions (for a picture interactive book) and video recording files. Moreover, an automatically started application can include a setup program that copies electronic content (e.g. files) encoded on an insemediastorage media onto a storage media permanently installed in the host device, for example a hard disk. Such a setup program can be appropriately programmed to start execution of, for example a software program that stores and manipulates various multimedia files as described above. Moreover, the setup program can be programmed to skip the copying step if such copying was previously done, e.g. the hard disk files are identical to the inserted storage media's files.

Figure 3C:
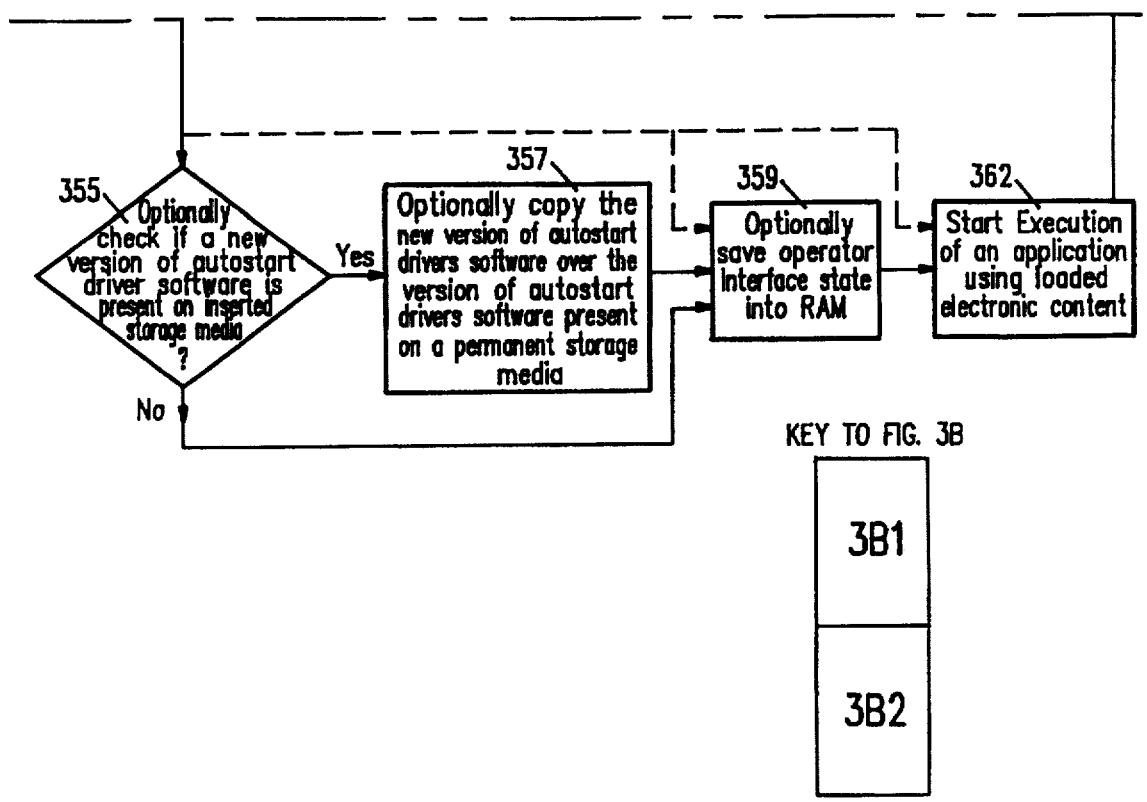
FIG. 3C illustrates various files on a removable storage media that are used by the embodiment of autostart driver illustrated in FIGS. 3A and 3B.
Figure 3C:
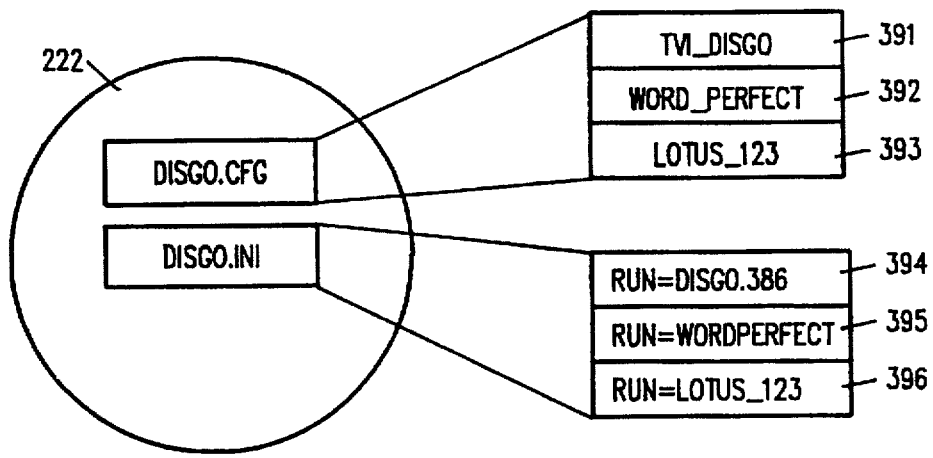
Figure 3D:
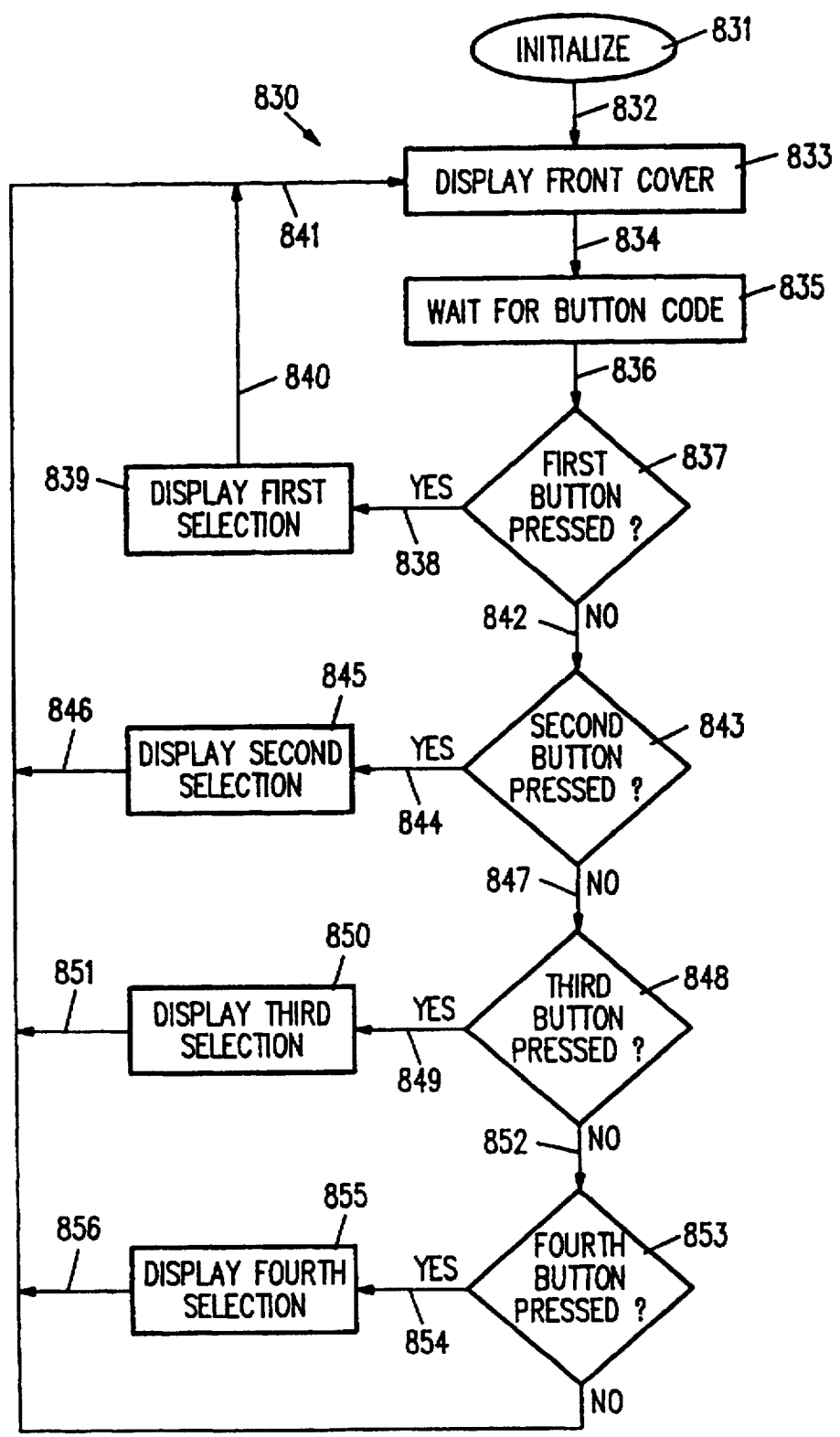
FIG. 3D illustrates, in a flow chart, a typical application started by the autostart driver of FIG. 2.

FIG. 3D is an illustrative flow chart for the high level control logic of an application 830 running in a host device 20 (FIG. 1A) for interpreting button codes from a remote control in accordance with this invention. Application 830 (FIG. 3D) can be used as an application for a four button remote control described in U.S. Pat. No. 5,597,307.

Application 830 can be started up by a user or automatically either immediately following a boot up sequence or by an autostart driver on detection of an inserted storage media. Application 830 initializes variables in step 831 and goes via branch 832 to step 833. In step 833 application 830 displays the front cover and goes via branch 834 to step 835. In step 835 application 830 waits until a button code is received from a remote control.

If a button code is received, application 830 goes via branch 836 to step 837. In step 837 application 830 checks the received button code to see if a first button (not shown) in the remote control was pressed. If the first button was pressed, application 830 goes via branch 838 to step 839. In step 839 application 830 retrieves the selection associated with the first button (such as a "SONG A" selection if the first button was pressed) from local (or remote storage media) and displays the retrieved selection. In one embodiment the application displays the audio recording for "Song A" through speaker 24A (FIG. 1) and optionally displays an associated video recording through monitor 22. Then application 830 goes via branches 840 and 841 back to step 833.

If in step 837 the first button was not pressed, application 830 goes via branch 842 to step 843. In step 843 application 830 checks to see if a second button (not shown) was pressed. If the second button was pressed, application 830 retrieves and displays the associated selection (such as a "SONG B" selection). Then application 830 goes via branches 846 and 841 back to step 833.

Steps 843, 848 and 853 are similar to step 837 and steps 845, 850 and 855 are similar to step 839. Therefore application 830 takes the appropriate actions if the second, third or fourth buttons are pressed in a manner similar to that described above for the first button.

In another embodiment of this invention, a host device 200 (FIG. 2) is programmed with an autostart driver 225 described below. Host device 200 is an IBM™ personal computer or a clone containing an industry standard 386 microprocessor (such as Intel™80386) as CPU 201 mounted on a system board 202. Also mounted on system board 202 is a read-only-memory (ROM) 203 and a random-access-memory (RAM) 204 that are coupled via a memory controller 205 to CPU 201. CPU 201 is also coupled through a bus interface unit 207 to a system bus 208 that is in turn coupled (1) through a videographics controller 209 to a monitor 210, (2) through a legacy bridge 211 to a legacy bus 212.

Legacy bus 212 is in turn coupled to various legacy components, such as floppy drive 213 (detachably coupled to floppy disk 214) and a mouse-keyboard controller 215 (detachably coupled to keyboard 216 and to mouse 235). System bus 208 is also coupled through a SCSI adapter 217 to a SCSI bus 218 that is in turn connected to various storage media peripherals, such as a hard disk drive 219 and a CD ROM drive 220. Hard disk drive 219 is connected to a storage media, such as hard disk 221. A removable storage media such as CD 222 can be detachably coupled to a removable storage media peripheral, such as CD ROM drive 220. System bus 208 can also be coupled via a PCMCIA adapter 225 to a memory card peripheral 226 that in turn can be coupled to a PCMCIA memory card (not shown).

In one embodiment, host device 200 is programmed with an autostart driver 225 (described more completely below) that can (1) automatically start for example one or more applications (also called "autostart applications") 226 and 227 when a removable storage media is inserted into a storage media peripheral, such as one of peripherals 213, 220 and 226, and (2) also automatically end autostart applications 226 and 227, when the inserted storage media, e.g. CD ROM 222 is removed from the corresponding storage media peripheral, e.g. CD ROM drive 220. The autostart applications function in a manner similar or identical to all other applications, such as applications 228, 229 and 230 that are started by operating system 231, except for being started and ended by autostart driver 225.

Autostart driver 225 includes a storage media manager 301 (FIG. 3A) that determines the status of one or more removable storage media peripherals of the host device, and an applications manager 302 that automatically starts and stops applications (also called "autostart applications") in response to various media status signals from the storage media manager 301. Autostart driver 225 also includes an initialization section 303 that performs various initialization functions, starts and stops execution of storage media manager 301 and applications manager 302.

Specifically, applications manager 302 includes an applications starter 302S that drives a start execution signal in response to an active media status signal. An active media status signal indicates that a storage media (e.g. a CD 222) that is compatible (as described below), has been inserted into a removable storage media peripheral (e.g. CD ROM drive 220 of host device 200). Applications manager 302 also includes an applications ender 302E that drives an end execution signal in response to a media status signal indicating that a previously inserted removable storage media has been removed from the corresponding removable storage media peripheral.

In this embodiment, applications manager 302 also drives one or more dialog command signals to display messages to a user, and optionally can also receive one or more dialog status signals, for example, in response to user input on a keyboard or a mouse.

In one embodiment, autostart driver 225 functions in an operating system that includes application programming interface sections 305 and 306. Applications programming interface section 305 transfers a media status signal from storage media manager 301 to applications manager 302. Applications programming interface section 306 starts the execution of an autostart application in response to a start execution signal from applications starter 302S, and ends the execution of the started application in response to an end execution signal from applications ender 302E. In this embodiment, applications programming interface section 306 also supplies application status signals to applications manager 302 which in turn supplies the application status signal through applications programming interface section 305 to the storage media manager 301.

In addition to the application programming interface sections 305 and 306 (FIG. 3A), operating system 231 (FIG. 2) also includes a storage media interface section 307 (FIG. 3A) and a graphical user interface section 308 (FIG. 3A) that respectively communicate with storage media peripherals (such as a floppy disk drive or a CD drive) and user interface peripherals (such as a monitor, a keyboard and a mouse). Storage media interface section 307 (FIG. 3A) drives media status signals in response to receipt of media command signals from, for example, storage media manager 301 (FIG. 3A). User interface section 308 drives dialog status signals in response to receipt of dialog command signals from, for example, applications manager 302 or autostart application 227 (FIG. 3A).

In one embodiment, before autostart driver 225 is installed in host device 200 (FIG. 2), a storage media (such as CD 222) containing the software for autostart driver 225 (FIG. 2) can be inserted into peripheral 220, and autostart driver 225 can be started by a user manually issuing a command from keyboard 216 or mouse 235 (FIG. 2) to operating system 231. On receipt of such a command, operating system 231 loads the software for autostart driver 225 and starts execution of autostart driver software.

At start-up, autostart driver 225 enables a timer interrupt in step 331 (FIG. 3B) and goes to step 333 and waits for the enabled interrupt. In step 333 when the interrupt occurs autostart driver 225 goes to step 335. In step 335, autostart driver 225 sets a current peripheral variable to a first removable storage media peripheral, for example, a floppy drive 213 having the label A. From step 335 autostart driver 225 goes to step 337 and gets the status of the current peripheral identified by the current peripheral variable, for example, by driving a media command signal and receiving a media status signal.

From step 337 autostart driver 225 goes to decision box 339 and checks if the status of the current peripheral has changed (e.g. inserted or removed). If the status has changed, autostart driver 225 goes via branch 340 to decision box 341, and checks if a removable storage media was recently inserted into the current peripheral. If inserted, autostart driver 225 goes from box 341 to step 343 and displays a disk inserted message on monitor 210. Step 343 is an optional step that can be skipped in one embodiment of autostart driver 225 (e.g. depending on a configuration flag set by the user to avoid display of the message in step 343). Step 343 can also be skipped depending on the configuration of a host device, for example autostart driver 225 is implemented in a game machine.

Figure 2:
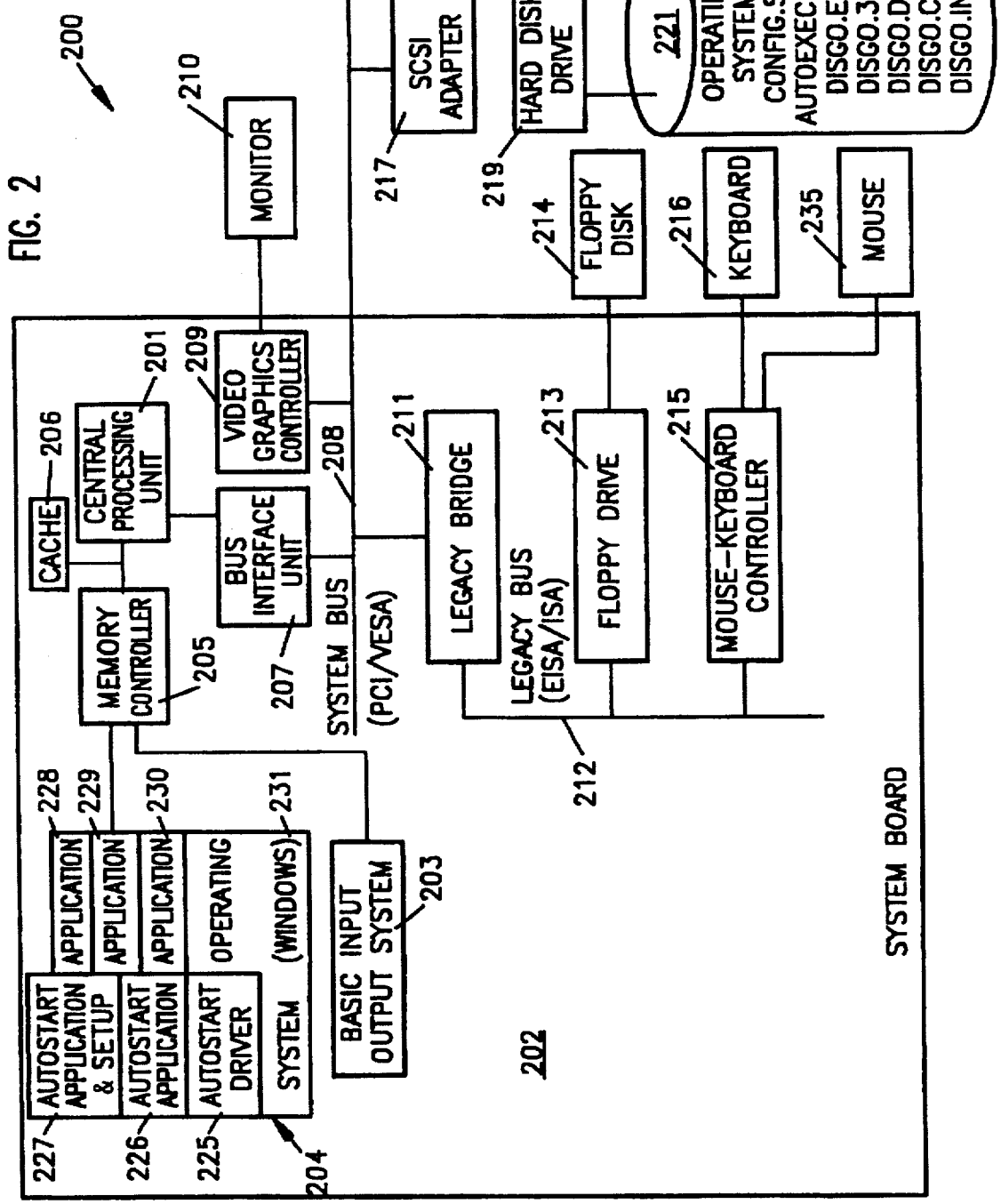
FIG. 2 illustrates in block diagram one embodiment of a host device in accordance with this invention.

After step 343, autostart driver 225 goes to step 345 and reads an identifier, such as a volume identifier, from the inserted removable storage media in the current peripheral. From step 345, autostart driver 225 goes to decision box 347 and checks if the identifier read in step 345 is present in a key file stored on a storage media that is permanently installed in the host device, such as hard disk 221 (FIG. 2). If present, autostart drivers 225 goes to step 349 and flags the current peripheral as being in use.

Decision box 347 is an optional decision box that can be replaced by decision box 364 in another embodiment. For example, such an autostart driver goes from step 345 to decision box 364 and checks if the inserted storage media contains an application profile file. If the application profile file is present, this alternative autostart driver can go to step 349 (described above). From decision box 364, the autostart driver can alternatively go to step 368 and update a key file and an application profile file, both located on a permanently installed storage media, such as hard disk 221. In such an embodiment, the autostart driver goes via branch 369 to step 349 (described above).

In decision box 347, if the result of the test was negative, autostart driver 225 goes to decision box 364 (described above).

After step 349 autostart driver 225 goes to step 351 and reads profile data from an application profile file located either on a permanently installed storage media, such as hard disk 221, or on the inserted storage media, such as floppy disk 214. Then autostart driver 225 goes to step 353 and uses the profile data read in step 351 to load a portion of the electronic content encoded on the inserted storage media into random access memory, such as RAM 204. From step 353 autostart driver 225 goes to decision box 355 and checks if a new version of autostart driver software, such as the files DISGO.EXE, DISGO.386 and DISGO.DLL are present on the previously inserted removable storage media, e.g. floppy disk 214. For example, autostart driver 225 checks whether the new version number is higher than the old version number. If a new version is present, autostart driver 225 goes to step 357 and copies a new version of the autostart driver software from the previously inserted removable storage media into the permanently installed storage media. From step 357 autostart driver 225 goes to step 359 and saves an operator interface state into random access memory 204. If the result of decision box 355 was not true, autostart driver 225 goes directly to step 359, i.e. skips step 357. From step 359 autostart driver 225 goes to step 362 and starts execution of an application using the loaded electronic content from random access memory 204.

From the step 362, autostart driver 225 goes directly back to step 331 described above.

If the result of decision box 341 was negative, autostart driver 225 goes to step 378 and displays an unloading message on host device monitor 210. From step 378, autostart driver 225 goes to step 380. Step 378 described above is an optional step that can be skipped in embodiments of an autostart driver used in host devices that do not have a monitor, such as the audio player for a car (as described above in reference to step 343). In such an embodiment, on a negative result in decision box 341, the autostart driver goes directly to step 380.

In step 380, autostart driver 225 resets the inuse flag that was set in step 349, and goes to step 382 and ends the execution of the application started in step 362.

From step 382, autostart driver 225 goes to step 384 and unloads the loaded electronic content by releasing the portions of random access memory 204 that had been occupied in step 353. From step 384 autostart driver 225 goes to step 386 and restores the operator interface displayed on monitor 210 to a new state that is identical to the state saved in step 359. From step 386, autostart driver 225 goes back to step 331 described above. Step 386 is an optional step, and in other embodiments, an autostart driver can go directly from step 384 to step 331.

In decision box 339, if the result was negative, autostart driver 225 goes to decision box 372 and determines if all of the removable storage media peripherals of host device 200 have been checked. If all such peripherals were checked, autostart driver 225 goes to step 331 described above. If the result in decision box 372 is negative, autostart driver 225 goes to step 374 and increments the current peripheral variable, to point to the next removable storage media peripheral, such as CD ROM drive 220 (FIG. 2). From step 374 autostart driver 225 goes to step 337 to check the status of the current peripheral, e.g. CD-ROM drive 220.

An embodiment of autostart driver 225 for use in the operating system Microsoft™ Windows can be implemented as illustrated by source code of computer programs and related data that are listed in microfiche Appendices A–F. Specifically, storage media manager 301 is illustrated by the software listed in Microfiche Appendix A and B, applications manager 302 is illustrated by the software listed in Microfiche Appendix B and initialization section 303 is illustrated by the software listed in Microfiche Appendices F, E and C.

In this specific embodiment, each of the interface sections, namely application programming interface sections 305, 306, storage media interface section 307 and user interface section 308 are all part of the operating system Microsoft™ Windows, version 3.1. Various functions provided by, and interfaces to these parts of Windows operating system are described in detail in a book entitled "Writing Windows Virtual Device Drivers" by Thielen and Woodruff, Addison Westley Publishing Company, 1994, which book is incorporated by reference herein in its entirety. Also incorporated by reference herein in its entirety is the Microsoft™ Windows Systems Development Kit and Device Driver Kit™ available on compact disk from Microsoft Corporation, One Microsoft Way, Redmond, Wash. 98052. In this embodiment, a portion of the storage media interface section 307 includes Microsoft Corporation's MSCDEX redirector software, that is described in detail in Chapter 11 entitled "Function Requests Specifications" included in the Device Driver Kit referenced above.

Specifically, an autostart driver software dynamic link library containing initialization section 301 (e.g. encoded in a file DISGO.DLL in CD 222) can be loaded into RAM 204 (FIG. 2) on issuance of the user command so that initialization section 303 starts executing and after completing initialization, for example by allocating memory sufficient for storage media manager 301 to be kept memory resident, starts execution of storage media manager 301 (e.g. encoded in a file DISGO.386 in CD 222) and applications manager 302 (e.g. encoded in a file DISGO.EXE in CD 222).

In one embodiment, autostart driver 225 performs initialization and then performs various steps illustrated in FIG. 3B. In one specific embodiment illustrated by software listed in the attached microfiche Appendices C, F and E, a routine Disgo_Init_Complete installs a timer interrupt handler DisGo_TimerInt (that is a part of storage media manager 301) toward the very end of processing of WINDOWS message Device_Init so as to wait until initialization is complete before grabbing timer ticks. Routine DisGo_Critical_Init polls all storage media peripherals once before installing handler DisGo_TimerInt which continues the polling, so that initial state of all storage media peripherals is known before periodic polling begins. Handler DisGo_TimerInt only polls storage media peripherals in the absence of block transfers to or from the storage media peripherals and other use of the CD-ROM interface MSCDEX, to avoid re-entrancy problems that can arise with asynchronous or isochronous polling.

In one specific embodiment, steps 331–341 described above are all performed by storage media manager 301 (FIG. 3A) that drives a logical media status signal (e.g. message DISK_INSERTED_STATE) to applications manager 302, and applications manager 302 in turn implements step 343 by driving a dialog command signal to user interface section 308. Storage media manager 301 also implements steps 345–349, 363–367, 371–375 and 380, while applications manager 302 implements the rest of the steps 350–362, 368, 378 and 381–387.

In one embodiment, on receipt of a physical media status signal indicating that the CD-ROM in a specified drive is part of a multi-volume set storage media manager 301 does not drive a logical media status signal when a storage media is removed from the peripheral to prevent applications manager 302 from shutting down the application, e.g. when the user changes CDs during normal use of a multi-volume set of CDs.

Storage media manager 301 can determine that a storage media without the application profile file DISGO.INI is autostart compatible if application profile data and the identifier for the polled peripheral's storage media is present in the hard disk application profile and key files, and were supplied for example on another CD-ROM produced by the same manufacturer to provide backward compatibility. The backward compatibility feature of storage media manager 301 explicitly forces consideration of for example a preexisting CD-ROM that does not have an application profile file appropriately as described above when the CD-ROM is inserted into or removed from the peripheral.

Storage media manager 301 and applications manager 302 that perform various steps illustrated in FIG. 3B can be implemented in one embodiment by software listed in the microfiche Appendices A–F as shown below in Table 1. As shown in Table 1, steps 382 and 384 are both performed by the call Send Message (hWnd,WM_CLOSE 0.0L) to operating system WINDOWs on page 23 of Appendix F.

TABLE 1

| STEP | REFERENCE TO SOURCE CODE IN MICROFICHE APPENDICES A-F |
|---|---|
| 107 | Appendix F, page 3, routine LibMain. |
| 109 | Appendix E, page 3, routine DisGoEvent and Appendix F, page 11, routine DisGoEnable Polling. |
| 331 | Appendix A, page 20, routine DisGo_Device_Init. |
| 333 | Appendix A, page 25, routine DisGo_TimerInt. |
| 335 | Appendix A, page 35, routine PollDrives the routine List_Get_First. |
| 337 | Appendix A, page 35, the label PD_CheckStatus and the instructions following this label up to the label PD_Done. These instructions in turn call the routine GetDriveStatus in Appendix A, page 40. |
| 339 | Appendix A, page 35, the instructions following label PD_CheckStatus and before the label PD_Done. Note: Table StateTransition supplies an index that uniquely identifies the routine to be executed depending on the change in state. (FIG. 4). |
| 341 | Appendix A, page 37, routine DiskInserted that is called indirectly from routine PollDrives through table StateTransition. |
| 343 | Appendix B, page 7, in case of state DISK_INSERTED_STATE the call to routine DialogBox. |
| 345 | Appendix F, page 12, routine GetVolumeID. |
| 347 | Appendix F, page 7, routine GetCfg. |
| 349 | Appendix A, page 38, routine DriveBusy. |
| 364 | Appendix B, page 8, routine DRIVE_ACTIVE_STATE, DisGoCompatibleDisk (F) (P12). |
| 368 | Appendix B, page 9, routine DisGoUpdate. |
| 351 | Appendix F, page 19, routine LanchDisApp. |
| 353 | Appendix F, page 16, routine AppStarted. |
| 355 | Appendix F, page 5, routine CfgUpdate. |
| 357 | Appendix F, page 6, routine CfgInit. |
| 359 | Appendix F, page 17, routine GetAppInst |
| 362 | Appendix F, page 16, routine AppStart |
| 380 | Appendix A, page 38, routine Disk Removed. |
| 382 | Appendix F, page 23, in routine EndDisGoApp, a Windows call to routine SendMessage |
| 384 | Appendix F, page 23, in routine EndDisGoApp, a Windows call to routine SendMessage |
| 386 | Appendix F, page 24, routine DisGoCleanUp. |
| 372 | Appendix A, page 35, routine PollDrives |
| 374 | Appendix A, page 35, routine PD_GetNext. |

Various messages illustrated in FIG. 3A are listed in Appendix C at page 9 under the comment "State machine state ID equates," and are generated by the software listed in microfiche Appendices A-F at various steps illustrated in FIG. 3B as shown in FIG. 4.

Key file DISGO.CFG (FIG. 3C) that is present on hard disk 221 permits autostart driver 225 to use environment data from the application profile file DISGO.INI on hard disk 221, which use is faster than accessing file DISGO.INI on the inserted storage media. To limit access to registration of new storage media with autostart driver 225, key file DISGO.CFG can be encrypted for example, using a DES encryption scheme, or alternatively by ORing one or more bits with a mask and by shifting the ORed bits.

Applications profile file DISGO.INI that is present on hard disk 221 is a collection of all application profile data in, for example, files of identical name DISGO.INI that are located in storage media that have been registered in key file DISGO.CFG. Applications profile file DISGO.INI present on hard disk 221 allows a user or an installation program to change application profile data, for example if a file name is misspelled in an identical name file present on CD 222.

In one specific embodiment, storage media manager 301 maintains storage media status list that includes a number of nodes for each storage media peripheral present on host device 200. The storage media status list is static and no nodes are added or removed after the list is initialized. Each node in the storage media status list includes memory elements in random-access-memory 204 that are addressed by a data structure CDROM_Drive_Status. The memory elements are part of the software code for autostart driver 225, and store current status information for the corresponding peripheral. In one specific embodiment, the status information held in each node is as follows:

```
CDROM_Drive_Status STRUC
    DriveStatus      dd    ; device status
                             doubleword, from MSCDEX
    DeviceHeader     dd    ; DOS device driver
                             header address, from
                             MSCDEX
    autostartStatus  dw    ; autostart status
                             word
    LastStatus       dw    ; last device driver
                             request status value
    CurrentState     dw    ; current state ID
                             value for dynamic
                             link library
    DriveID          db    ; drive letter: 'A'-'Z'
                             (i.e. a label)
    DeviceID         db    ; 0-based device ID
    ErrorCount       db    ; number of device errors
    DeviceSegment    dw    ; segment address of
                             device driver
    DeviceStrategy   dw    ; offset of device
                             driver strategy
                             routine
    DeviceInterrupt  dw    ; offset of device
                             driver interrupt
                             routine
CDROM_Drive_Status ENDS
```

The status information Drive Status stored in such memory elements can be updated by a polling routine 401 (illustrated in FIG. 4) that is included in one embodiment of storage media manager 310. Polling routine 401 can be implemented to either periodically poll the storage media peripherals using the ASPI polling interface or to wait for an asynchronous interrupt from a storage media peripheral using the ASPI posting interface, as described in Advanced SCSI Programming Interface (ASPI) Software Developer Kit Manual, available from Adaptec, Inc., Department 112, 200 Parkside Drive, San Fernando, Calif. 91340–3092, with phone: (800) 934-2766; that is incorporated herein in its entirety.

In one embodiment, polling routine 401 periodically monitors the state of each storage media peripheral of host device 200, by driving media command signals and sensing media status signals to determine if storage media has been inserted into or removed from the peripheral. Specifically, for each storage media peripheral, polling routine 401 implements steps 331-339, 372 illustrated in FIG. 3B by performing one or a number of polling cycles that are implemented by a timer interrupt handler, and maintains status information by using a state machine as follows. Polling routine 401 sets the state of each storage media peripheral to a don't know state 411 when the current status of a storage media peripheral is unknown (for example at initialization). For each peripheral that is in don't know state 411, polling routine 401 drives media command signal (e.g. message WM_DISGOEVENT) to the specific storage media peripheral to inquire the status. After receiving media status signal (e.g. message DRIVE_EMPTY_STATE) indicating the status of the polled peripheral, at the next polling cycle, polling routine 401 changes the state of the polled peripheral as shown by branch 412 to the drive empty state 413 if no storage media is present, as shown by branch 420 to a drive busy state 418 if the peripheral is busy, or as shown by branch 425 to drive ready state 423 if no storage media is present. In one embodiment message DRIVE_READY_STATE includes a file system in conformance with ISO9660 that is described in the paper "Introduction to ISO9660" available from Disc Manufacturing Inc., 1409 Foulk Road, Suite 102, Wilmington, Del. 19803, that is incorporated by reference herein in its entirety. The ISO9660 file system includes a volume identifier that can be compared with an identifier stored in a key file as described above.

Polling routine 411 leaves a peripheral's state unaltered in don't know state 411 in case of an error indicated by the media status signal, such as an error from CD-ROM interface MSCDEX. Polling routine 401 also allows the state of a peripheral to remain unaltered in drive empty state 413 if the media status signal indicates an error or that a storage media is not present.

Polling routine 401 changes the state of a storage media from the drive empty state 413 to the disk inserted state 416 if the media status signal (e.g. message DISK_INSERTED_STATE) indicates that the polled peripheral is busy, or that a storage media has been inserted, irrespective of whether the storage media is ready to be read. Polling routine 401 can be implemented to go to state 416 on an invalid function error because MSCDEX returns this value when a CD has been inserted, but is not ready to be read. For each storage media peripheral in the disk inserted state 416, polling routine 401 drives a media status signal (e.g. message DRIVE_READY_STATE) to applications starter 305.

Polling routine 401 changes the state of each storage media peripheral from the disk inserted state 416 to the don't know state 411 via branch 419 if the media status signal indicates that the storage media is present and also that the storage media peripheral is not busy. Also, polling routine 401 changes the state of each storage media peripheral from the disk inserted state 416 via branch 417 to the drive busy state 418 if the media status signal indicates that the polled peripheral is busy.

Polling routine 411 allows the state of each storage media peripheral to remain unaltered in the drive busy state 418 if the media status signal indicates that the polled peripheral is busy, or in case of error. Polling routine 401 changes the state of each peripheral from the drive busy state 418 via branch 422 to the drive ready state 423 if the media status signal indicates that the storage media is present.

Polling routine 401 changes the state of each storage media peripheral from the drive ready state 423 via branch 426 to the drive active state 427 unconditionally at the next polling cycle.

For all storage media peripherals in the drive ready state 423, polling routine 401 drives a media status signal to the applications starter 305 that in turn starts execution of an autostart application, e.g. application 226 or 227. Polling routine 401 allows the state of each storage media peripheral in the drive active state 427 to remain unaltered, if the storage media remains present in the peripheral, as shown by branch 428. Therefore, the state of a storage media peripheral that is associated with an executing application is the drive active state 427. The drive active state 427 is an optional state that can be included in drive ready state 423, thereby eliminating the step of waiting for the next polling cycle to transition from state 423 to state 427.

Polling routine 401 changes the state of each storage media peripheral from the drive active state 427, via branch 429 to the disk removed state 430, if the media status signal (e.g. message DISK_REMOVED_STATE) indicates that a storage media is no longer present in the polled peripheral. Polling routine 401 changes the state of each storage media peripheral in the disk removed state 430 via branch 432 to the drive empty state 413 if the storage media is no longer present in the peripheral, or alternatively to don't know state 411 if the storage media is present in the peripheral, as indicated by the media status signals.

Polling routine 401 changes the state of each storage media peripheral from the drive active state 427 to the disk aborted state 434 on occurrence of a critical read fault, for example, when an autostart application attempts to read from a peripheral lacking a removable storage media. Polling routine 401 drives a logical media status signal (e.g. message DISK_ABORTED_STATE) for each storage media peripheral in the disk aborted state 434, and then changes the disk aborted state 434 to the drive empty state 413 on receipt of a logical application status signal indicating that a corresponding application has been closed.

In the embodiment illustrated in microfiche Appendices A-F, polling routine 401 is implemented as the routine PollDrives, and makes transitions between various states based on signals indicated in a bit DEVICE_BUSY in a variable RH_Status stored in RAM 204, a bit NO_DISK_PRESENT in the variable DS_Status stored in RAM 204, and the error value INVALI_FUNCTION returned by the Windows CD-ROM extension interface MSCDEX. In this embodiment, each of these signals are indicated by the data structure CDROM_DRIVE_STATUS in the field DriveStatus of pointer hDisGoList that is listed, for example, at page 18 of Appendix A.

Drive busy state 418 permits applications manager 302 to display a message to the user on monitor 210, for example, by driving a dialog command signal to user interface section 308 while a storage media is being coupled, for example, by spinning up a disk that can take up to one minute in certain cases. Such a message indicates to the user that a long delay is a normal condition, and that there is no malfunction in the host device 200.

An error condition can arise if a user inserts a CD-ROM and immediately pushes the 'eject' button, if the polling routine 401 transitions from state DISK_INSERTED to state DRIVE_READY with no disk present. To avoid such an error condition, on insertion of a storage media, polling routine 401 notifies applications manager 302 of the insertion event, and transitions to state DRIVE_BUSY to wait for the storage media to become ready to be read, unless the storage media is already ready, in which case polling routine 401 transitions to state DRIVE_READY. In one specific embodiment, to detect an insertion event as quickly as possible, routine PollDrives waits for interface MSCDEX to return the value ERR_INVALID_FUNCTION, which happens when the CD-ROM drive goes busy immediately after a disk is inserted.

It is to be understood that the above description is intended to be illustrative and not restrictive. Many variations of the invention will become apparent to those of skill in the art upon review of this disclosure. Although one implementation of an autostart driver has been disclosed based on a number of routines, any types of routines having any attributes of data and/or function can be built into an autostart driver in accordance with this invention.

Although host device 200 illustrated in FIG. 2 has peripherals 219 and 220 coupled via a SCSI adapter 217, in other embodiments, a host device's peripherals can be coupled in other ways, which are not critical aspects of this invention. For example, either one or both peripherals 219 and 220 can be coupled to legacy bus 212 that in turn may be directly coupled to bus interface unit 207 in another embodiment of host device 200. Moreover, host device 200 can include other storage media peripherals, such as memory card drive 223 (shown dotted) or a tape driver (not shown).

Although source code illustrating one specific embodiment of autostart driver 225 is listed in microfiche Appendices A-F (that were incorporated by reference above) for operating system Microsoft™ Windows, version 3.1, various modifications and adaptations of the autostart driver described above will be apparent to a person of skill in the art of computer engineering in view of the enclosed description, for example, for use with DOS operating system or Macintosh™ operating system, running on respective host devices IBM™ PC and Apple™ Macintosh. Similarly, other embodiments of the autostart driver described herein can be implemented, for example, for use with Sega™ Saturn game machine, for use with JVC's XCSV1 Video CD player, or for use in any television settop box. Also, although in one embodiment, the storage media manager and the applications manager each consist essentially of an appropriately programmed central processing unit (CPU), in other embodiments, either or both managers can be hard wired logic or some combination of hardware, firmware and software, as is readily apparent to the person of skill. Therefore the appended claims cover many variations and modifications of the embodiments described herein.

We claim:

1. A method for automatically starting execution and automatically ending execution of a process in a host device based on insertion and removal of a removable storage media into a peripheral of said host device, said method comprising:

checking for insertion of said removable storage media in said peripheral;

loading into a portion of random access memory of said host device at least a portion of the electronic content retrieved by said peripheral from a removable storage media in response to finding said removable storage media inserted in said peripheral during said checking;

automatically starting execution of an application after said loading, wherein said application uses at least a portion of said loaded electronic content;

checking for removal of said removable storage media from said peripheral;

automatically ending execution of said application in response to finding said removable storage media removed from said peripheral during said checking; and automatically releasing said portion of said random access memory occupied during said loading.

2. The method of claim 1 further comprising:

restoring an operator interface displayed by said host device to a new state substantially identical to an old state, said old state being the state of said operator interface immediately prior to said automatically starting execution.

3. The method of claim 1 further comprising:

receiving status of said removable storage media periodically between said automatically starting execution and said automatically ending execution.

4. The method of claim 1 further comprising:

displaying a selection encoded on said removable storage media in the form of electronic content, said displaying occurring after said automatically starting execution.

5. The method of claim 1 further comprises:

displaying a message on a video display unit of said host device to indicate status of said automatically ending.

6. The method of claim 1 further comprises:

displaying a message on a video display unit of said host device to indicate status of said automatically starting execution.

7. The method of claim 1 further comprises:

comparing a new version number of a file of a predetermined name in said removable storage media with an old version number of a file of said predetermined name in a storage media permanently installed in said host device; and copying said file of said predetermined name from said removable storage media to said permanently installed storage media.

8. The method of claim 7 wherein said file of said predetermined name comprises software instructions that implement said checking for insertion, said loading, said automatically starting, said automatically ending, and said automatically releasing.

9. The method of claim 7 wherein said copying is performed only if said new version number is higher than said old version number.

10. The method of claim 1 wherein said checking comprises responding to a periodic timer interrupt to detect said inserted removable storage media.

11. The method of claim 1 comprising responding to an asynchronous interrupt from a peripheral to detect said inserted removable storage media during said checking.

12. The method of claim 1 further comprising:

reading an identifier from said removable storage media; and checking if said identifier is present on a first file located on a storage media permanently installed in said host device.

13. The method of claim 12 further comprising:

checking for a second file on said removable storage media if said first file does not contain said identifier, said second file containing environment data; and using, during said loading, said environment data from said second file to identify at least the name of the portion of electronic content to be loaded.

14. The method of claim 13 further comprising:

copying the environment data from said second file to said permanently installed storage media; and adding said identifier to said first file.

15. The method of claim 1 further comprising:

using environment data in a file located on said removable storage media during said loading.

16. The method of claim 1 wherein said portion of electronic content comprises software instructions used during said execution.

17. The method of claim 1 wherein said portion of electronic content comprises data used during said automatically starting execution.

18. The method of claim 1 further comprising:

setting a flag to indicate said peripheral as being in use in response to said insertion of said removable storage media; and resetting said flag to indicate said peripheral as being not in use in response to removal of said removable storage media.

19. The method of claim 1 wherein said application comprises a program that copies at least a portion of electronic content encoded on said removable storage media into a storage media permanently installed in said host device.

20. A method for automatically starting execution of a process in a host device in response to insertion of a removable storage media into a peripheral of said host device and automatically ending execution of said process in response to removal of said removable storage media, said method comprising:

waiting for an interrupt;

automatically checking said removable storage media for a file of a predetermined name in response to occurrence of said interrupt;

automatically starting execution of an application by loading at least a portion of electronic content from said removable storage media into a portion of random access memory of said host device subsequent to finding said predetermined name file during said checking and;

automatically ending execution of said application in response to removal of said removable storage media.

21. The method of claim 20 further comprising detecting insertion of said removal storage media during said waiting.

22. The method of claim 20 further comprising again waiting for said interrupt, after said automatically starting execution.

23. The method of claim 20 further comprising reading an identifier from said removable storage media and checking for said read identifier in a file of a different predetermined name.

24. The method of claim 20 further comprising searching for another file of said predetermined name in a storage media permanently installed in said host device.

25. The method of claim 20 wherein said automatically starting execution comprises utilizing said electronic content portion as instructions to be executed by said application.

26. The method of claim 20 wherein said automatically starting execution comprises utilizing said electronic content portion as data to be operated on by said application.

27. The method of claim 20 further comprising searching for another file of said predetermined name only in said removable storage media.

28. A method for automatically starting and ending execution of a process in a host device, said method comprising:

booting an operating system of said host device;

automatically checking, in a peripheral, for an insertion or a removal of a removable storage media after completion of said booting; and performing at least one of the following depending on the result of said automatically checking:

automatically starting execution of a process in response to finding said removable storage media inserted during said automatically checking;

automatically ending execution of a previously started process in response to finding a previously inserted removable storage media removed during said automatically checking.

29. The method of claim 28 further comprising:

automatically displaying a selection encoded in said removable storage media.

30. The method of claim 28 wherein:

said automatically checking includes checking each one of a plurality of peripherals included in said host device.

31. The method of claim 28 further comprising:

powering up said host device and executing firmware from a read only memory of said host device during said booting.

32. The method of claim 28 further comprising:

automatically loading, into a portion of random access memory of said host device, at least a portion of electronic content retrieved by said peripheral from said removable storage media; and displaying said portion of electronic content on a screen of said host device.

33. The method of claim 32, wherein:

said portion of the electronic content includes a video recording; and said method further comprises displaying said video recording on a screen of said host device.

34. The method of claim 28 wherein, depending on said each of said automatically starting execution and said automatically ending execution is performed, and said performing step further comprising:

returning to said automatically checking after said automatically starting; and returning to said automatically checking after said automatically ending.

* * * * *